US012754292B2

(12) United States Patent
Chen et al.

(10) Patent No.: US 12,754,292 B2
(45) Date of Patent: Oct. 6, 2026

(54) ACTIVE OPTICAL SENSOR PROVIDING NEAR AND FAR FIELD TARGET DETECTION

(71) Applicant: Apple Inc., Cupertino, CA (US)

(72) Inventors: Tong Chen, Fremont, CA (US); Brandon J. Hui, San Francisco, CA (US); Jianmin Gong, San Jose, CA (US); Mark T. Winkler, San Jose, CA (US); Runyu Liu, Sunnyvale, CA (US); Yazan Z Alnahhas, Stanford, CA (US); Yohai Zmora, San Francisco, CA (US)

(73) Assignee: Apple Inc., Cupertino, CA (US)

( * ) Notice: Subject to any disclaimer, the term of this patent is extended or adjusted under 35 U.S.C. 154(b) by 721 days.

(21) Appl. No.: 18/195,867

(22) Filed: May 10, 2023

(65) Prior Publication Data

US 2024/0004034 A1 Jan. 4, 2024

Related U.S. Application Data

(60) Provisional application No. 63/356,934, filed on Jun. 29, 2022.

(51) Int. Cl.
*G01S 7/481* (2006.01)
*G01S 17/08* (2006.01)

(52) U.S. Cl.
CPC .......... *G01S 7/4813* (2013.01); *G01S 7/4815* (2013.01); *G01S 7/4816* (2013.01); *G01S 17/08* (2013.01)

(58) Field of Classification Search
None
See application file for complete search history.

(56) References Cited

U.S. PATENT DOCUMENTS 4,254,333 A 3/1981 Bergström
4,468,131 A 8/1984 Bui et al.
(Continued)

FOREIGN PATENT DOCUMENTS

CN 101592762 12/2009
CN 102109650 6/2011
(Continued)

OTHER PUBLICATIONS

English translation of CN-110945378-A, Munzer, 2020 (Year: 2020).*
(Continued)

*Primary Examiner* — James M Hannett
(74) *Attorney, Agent, or Firm* — Brownstein Hyatt Farber Schreck, LLP

(57) ABSTRACT

An optical sensor module includes a module housing defining a first compartment having a first aperture and a second compartment having a second aperture, with the second aperture spaced apart from the first aperture. A set of optical emitters is disposed in the first compartment and configured to emit light through the first aperture. A first set of optical detectors is disposed in the first compartment and configured to receive a first redirected portion of the emitted light through the first aperture. A set of optical elements is disposed in the first compartment and configured to direct at least a portion of the emitted light or the first redirected portion of the emitted light. A second set of optical detectors is disposed in the second compartment and configured to receive a second redirected portion of the emitted light through the second aperture.

17 Claims, 16 Drawing Sheets

(56) References Cited

U.S. PATENT DOCUMENTS 4,913,547 A 4/1990 Moran
5,500,708 A 3/1996 Ohsawa
5,565,986 A 10/1996 Knuttel
5,781,297 A 7/1998 Castore
5,825,465 A 10/1998 Nerin et al.
5,966,229 A 10/1999 Dodley et al.
6,233,045 B1 5/2001 Suni et al.
6,531,767 B2 3/2003 Shrauger
6,724,486 B1 4/2004 Shull et al.
6,816,523 B1 11/2004 Glenn et al.
6,872,931 B2 3/2005 Liess et al.
6,885,438 B2 4/2005 Deines
7,139,446 B2 11/2006 Slotwinski
7,184,445 B2 2/2007 Guenter
7,277,180 B2 10/2007 Townley-Smith et al.
7,336,368 B2 2/2008 Liao et al.
7,366,217 B2 4/2008 Guenter et al.
7,388,672 B2 6/2008 Zhou et al.
7,509,050 B2 3/2009 Ekkizogloy et al.
7,557,795 B2 7/2009 Kong et al.
7,589,709 B2 9/2009 Liess et al.
7,620,332 B2 11/2009 Nishiyama
7,667,851 B2 2/2010 Dubois et al.
7,675,020 B2 3/2010 Machida
7,684,957 B2 3/2010 Ueno
7,995,193 B2 8/2011 Kuwata
8,174,597 B2 5/2012 Ogasawara
8,208,814 B2 6/2012 Sheth et al.
8,248,615 B2 8/2012 Ueno
8,378,287 B2 2/2013 Schemmann et al.
8,405,902 B2 3/2013 Irie
8,416,424 B2 4/2013 Werner et al.
8,444,331 B2 5/2013 Kobayashi
8,446,592 B1 5/2013 Arissian
8,529,460 B2 9/2013 Kawano et al.
8,537,341 B2 9/2013 Ueno
8,736,581 B2 5/2014 Han et al.
8,751,091 B2 6/2014 Moench et al.
8,781,687 B2 7/2014 Han et al.
8,896,745 B2 11/2014 Takachi
8,942,069 B2 1/2015 Tortora
9,004,698 B2 4/2015 Kilcher et al.
9,068,916 B2 6/2015 Heng
9,091,573 B2 7/2015 Van Der Lee et al.
9,091,747 B2 7/2015 Pruijmboom
9,146,304 B2 9/2015 Land et al.
9,160,390 B2 10/2015 Zhou et al.
9,170,088 B2 10/2015 Lim et al.
9,420,155 B2 8/2016 Brodie
9,459,352 B2 10/2016 Becker et al.
9,588,586 B2 3/2017 Rihn
9,648,221 B2 5/2017 Seo et al.
9,658,113 B2 5/2017 Bosch et al.
9,677,986 B1 6/2017 Baldwin et al.
9,703,173 B2 7/2017 Brodie
9,726,474 B2 8/2017 Royo Royo et al.
9,772,398 B2 9/2017 Bikumandla et al.
9,778,037 B2 10/2017 Bestler
9,911,890 B2 3/2018 Renard et al.
9,912,923 B2 3/2018 Kilcher et al.
9,952,245 B2 4/2018 Ueno
9,995,877 B2 6/2018 Nakamura
RE46,930 E 7/2018 Mimeault
10,070,799 B2 9/2018 Ang et al.
10,184,783 B2 1/2019 Flanders et al.
10,215,555 B2 2/2019 Chen et al.
10,222,474 B1 3/2019 Raring et al.
10,317,651 B2 6/2019 Furutake et al.
10,379,028 B2 8/2019 Spruit et al.
10,386,554 B2 8/2019 Hjelmstrom et al.
10,444,359 B2 10/2019 Pacala et al.
10,492,679 B2 12/2019 Zhou
10,503,048 B2 12/2019 Del Bino et al.
10,553,179 B2 2/2020 Holenarsipur et al.
10,554,311 B2 2/2020 Pang et al.
10,555,079 B2 2/2020 Bakish
10,581,474 B1 3/2020 Robert et al.
10,613,625 B2 4/2020 Huang et al.
10,614,295 B2 4/2020 Kim et al.
10,635,800 B2 4/2020 Bakish
10,705,211 B2 7/2020 Jacobs et al.
10,718,922 B2 7/2020 Yong et al.
10,791,283 B2 9/2020 Bardagjy et al.
10,824,275 B2 11/2020 Mutlu et al.
10,845,873 B2 11/2020 Huang
10,866,083 B2 12/2020 Van Der Lee et al.
10,871,820 B2 12/2020 Mutlu et al.
10,871,836 B2 12/2020 Dashevsky
10,908,383 B1 * 2/2021 Mackinnon ........... G01S 7/4815
10,962,628 B1 * 3/2021 Laifenfeld .............. G01S 7/487
10,970,556 B2 4/2021 Teich et al.
11,022,835 B2 6/2021 Jamali et al.
11,036,318 B2 6/2021 Kuboyama et al.
11,073,615 B2 7/2021 Chua et al.
11,092,480 B2 8/2021 Garrett et al.
11,092,531 B2 8/2021 Spruit et al.
11,112,233 B2 9/2021 Mutlu et al.
11,150,332 B1 10/2021 Chen et al.
11,156,456 B2 10/2021 Chen et al.
11,157,113 B2 10/2021 Winkler et al.
11,175,700 B1 11/2021 Poole
11,243,068 B1 2/2022 Mutlu et al.
11,243,686 B2 2/2022 McCord
11,280,714 B2 3/2022 Momtahan et al.
11,327,008 B2 5/2022 Venturini et al.
11,360,440 B2 6/2022 Perkins et al.
11,422,638 B2 8/2022 Mutlu et al.
11,460,293 B2 10/2022 Chen et al.
11,494,926 B1 11/2022 Wu
11,549,799 B2 1/2023 Tan et al.
11,629,948 B2 4/2023 Shou et al.
11,692,925 B2 7/2023 Spruit et al.
11,822,095 B2 11/2023 Park et al.
2005/0156874 A1 7/2005 Kong
2005/0157971 A1 7/2005 Juijve
2006/0182383 A1 8/2006 Slotwinski
2006/0239312 A1 10/2006 Kewitsch et al.
2008/0007713 A1 1/2008 Zijp
2008/0123106 A1 5/2008 Zeng et al.
2009/0002829 A1 1/2009 Shinohara
2010/0053636 A1 3/2010 Holmes et al.
2011/0126617 A1 6/2011 Bengoechea Apezteguia et al.
2011/0267467 A1 11/2011 Kimura et al.
2011/0301455 A1 12/2011 Numajiri et al.
2012/0026503 A1 2/2012 Lewandowski et al.
2012/0262722 A1 10/2012 Lim et al.
2012/0281221 A1 11/2012 Studer et al.
2013/0063718 A1 3/2013 Bernal et al.
2014/0293055 A1 10/2014 Otsuka
2015/0309568 A1 10/2015 Miki
2016/0021285 A1 1/2016 Nadler et al.
2016/0146938 A1 5/2016 Becker et al.
2017/0192133 A1 7/2017 Murakami et al.
2017/0343817 A1 11/2017 Bietry et al.
2017/0344812 A1 11/2017 Kim et al.
2018/0027339 A1 1/2018 Blumkin et al.
2018/0073924 A1 3/2018 Steinmann et al.
2018/0081434 A1 3/2018 Siddiqui et al.
2018/0139534 A1 5/2018 Fishman et al.
2018/0232511 A1 8/2018 Bakish
2019/0146065 A1 5/2019 Jutte et al.
2019/0278099 A1 * 9/2019 Zhou .................... H04N 13/296
2019/0302268 A1 10/2019 Singer et al.
2019/0317454 A1 10/2019 Holenarsipur et al.
2019/0319157 A1 10/2019 Coffy et al.
2020/0200522 A1 6/2020 Huang et al.
2020/0370879 A1 11/2020 Mutlu et al.
2020/0412980 A1 * 12/2020 Agranov ............... H10F 39/184
2021/0015350 A1 1/2021 Butte et al.
2021/0083664 A1 3/2021 Rouaissia et al.
2021/0104873 A1 4/2021 Gerlach
2021/0116355 A1 4/2021 Spruit et al.
2021/0199769 A1 * 7/2021 Meylan ................. G01S 7/4811
2021/0294489 A1 9/2021 Li et al.

(56) References Cited

U.S. PATENT DOCUMENTS

| | | | | |
|---|---|---|---|---|
| 2022/0003543 | A1 | 1/2022 | Chen et al. | |
| 2022/0074844 | A1 | 3/2022 | D'Apuzzo et al. | |
| 2022/0109442 | A1 | 4/2022 | Liu et al. | |
| 2022/0155052 | A1 | 5/2022 | Mutlu et al. | |
| 2022/0202515 | A1 | 6/2022 | Itkowitz et al. | |
| 2022/0404138 | A1 | 12/2022 | Mutlu et al. | |
| 2023/0003938 | A1 | 1/2023 | Zilkie et al. | |
| 2023/0087691 | A1 | 3/2023 | Chen et al. | |
| 2023/0160681 | A1 | 5/2023 | Hai Vidal | |
| 2023/0314185 | A1 | 10/2023 | Chen et al. | |
| 2023/0366672 | A1 | 11/2023 | Huang et al. | |
| 2024/0003671 | A1 | 1/2024 | Jin et al. | |
| 2024/0045511 | A1 * | 2/2024 | Raynor | G06F 3/0346 |
| 2024/0134483 | A1 | 4/2024 | Nevou et al. | |

FOREIGN PATENT DOCUMENTS

| | | | | |
|---|---|---|---|---|
| CN | 102484353 | | 5/2012 | |
| CN | 105223579 | | 1/2016 | |
| CN | 107564924 | | 1/2018 | |
| CN | 108225543 | | 6/2018 | |
| CN | 208969541 | | 6/2019 | |
| CN | 110945378 | A * | 3/2020 | G01S 7/4816 |
| CN | 108692663 | | 4/2020 | |
| CN | 110998365 | | 4/2020 | |
| CN | 110999074 | | 4/2020 | |
| CN | 111788574 | | 10/2020 | |
| EP | 3185037 | A1 * | 6/2017 | G01S 17/894 |
| EP | 3598591 | | 1/2020 | |
| EP | 3796140 | | 3/2021 | |
| GB | 2441557 | | 3/2008 | |
| GB | 2443662 | | 5/2008 | |
| JP | 2004504634 | | 2/2004 | |
| JP | 2005528682 | | 9/2005 | |
| JP | 2009222573 | | 10/2009 | |
| JP | 2010511883 | | 4/2010 | |
| JP | 2010526315 | | 7/2010 | |
| JP | 2011523700 | | 8/2011 | |
| JP | 2012521003 | | 9/2012 | |
| JP | 2013508717 | | 3/2013 | |
| JP | 2014078823 | | 5/2014 | |
| JP | 2014534459 | | 12/2014 | |
| JP | 2015078946 | | 4/2015 | |
| JP | 2019515258 | | 6/2019 | |
| JP | 2019121691 | | 7/2019 | |
| JP | 7453220 | B2 * | 3/2024 | H10F 30/225 |
| KR | 101792588 | | 10/2012 | |
| WO | WO 05/013517 | | 2/2005 | |
| WO | WO 09/156937 | | 12/2009 | |
| WO | WO 10/139144 | | 12/2010 | |
| WO | WO 12/049561 | | 4/2012 | |
| WO | WO 17/178711 | | 10/2017 | |
| WO | WO 18/036685 | | 3/2018 | |
| WO | WO 19/015623 | | 1/2019 | |
| WO | WO 19/042953 | | 3/2019 | |

OTHER PUBLICATIONS

English translation of EP-3185037-A, Yang, 2017 (Year: 2017).*

English translation of JP-7453220-B2, ステインバーグ, 2024 (Year: 2024).*

Diao et al., "High-speed high-resolution heterodyne interferometer using a laser with low beat frequency," *Applied Optics*, vol. 55, No. 1, 2015, pp. 110-116.

U.S. Appl. No. 17/710,682, filed Mar. 31, 2022, Chen et al..

Kliese et al., "Spectral broadening caused by dynamic speckle in self-mixing velocimetry sensors"; The University of Queensland, School of Information Technology and Electrical Engineering; Brisbane, QLD 4072, Australia; 15 pgs.

* cited by examiner

ACTIVE OPTICAL SENSOR PROVIDING NEAR AND FAR FIELD TARGET DETECTION

CROSS-REFERENCE TO RELATED APPLICATION

This application is a nonprovisional and claims priority under 35 U.S.C. § 119(e) to U.S. Provisional Patent Application No. 63/356,934, filed Jun. 29, 2022, the contents of which are incorporated herein by reference as if fully disclosed herein.

FIELD

The described embodiments generally relate to optical sensors that are used to sense various physical phenomena (e.g., presence, distance, proximity, velocity, size, surface properties, particle count, etc.).

BACKGROUND

Sensor systems are included in many of today's electronic devices, including electronic devices such as smartphones, computers (e.g., tablet computers or laptop computers), wearable electronic devices (e.g., electronic watches or health monitors), game controllers, appliances, or navigation systems (e.g., vehicle navigation systems or robot navigation systems). Sensor systems may variously sense phenomena such as the presence of objects, distances to objects or proximities of objects, movements of objects (e.g., whether objects are moving, or the speed, acceleration, or direction of movement of objects), or properties of objects.

Given the wide range of sensor system applications, any new development in the configuration or operation of a sensor system can be useful. New developments that may be particularly useful are developments that reduce the cost, size, complexity, part count, or manufacture time of the sensor system; or developments that improve the sensitivity, range, speed, or of sensor system operation; or developments that increase the range of applications for a sensor system.

SUMMARY

Embodiments of the systems, devices, methods, and apparatus described in the present disclosure are directed to optical sensor modules that provide both near and far field target detection. More particularly, the described systems, devices, methods, and apparatus pertain to active optical sensors and/or bistatic optical sensor modules that are capable of near and far field target detection. Although conventional bistatic optical sensor modules can provide good far field target detection, design features intended to reduce their in-module and system level crosstalk (i.e., crosstalk between their optical emitters and optical detectors) can negatively impact (and even eliminate) their near field target detection capabilities.

In a first aspect, the present disclosure describes an optical sensor module. The optical sensor module may include a module housing defining a first compartment having a first aperture and a second compartment having a second aperture. The second aperture may be spaced apart from the first aperture. The optical sensor module may also include a set of one or more optical emitters disposed in the first compartment and configured to emit light through the first aperture; a first set of one or more optical detectors disposed in the first compartment and configured to receive a first redirected portion of the emitted light through the first aperture; a set of one or more optical elements disposed in the first compartment and configured to direct at least a portion of the emitted light or the first redirected portion of the emitted light; and a second set of one or more optical detectors disposed in the second compartment and configured to receive a second redirected portion of the emitted light through the second aperture.

In another aspect of the disclosure, the present disclosure describes a bistatic optical sensor module. The bistatic optical sensor module includes an emitter compartment having a first aperture, and a detector compartment having a second aperture. An optical emitter may be disposed in the emitter compartment. An optical detector may be disposed in the emitter compartment. A set of one or more polarization-dependent optical elements may be disposed in the emitter compartment and may: receive light emitted by the optical emitter, emit light having a first polarization through the first aperture, and pass light received through the first aperture and having a second polarization to the optical detector.

In another aspect, the present disclosure describes a bistatic optical sensor module. The bistatic optical sensor module may include an emitter compartment, a detector compartment, and a single-photon avalanche detector (SPAD) disposed in the emitter compartment.

In addition to the exemplary aspects and embodiments described above, further aspects and embodiments will become apparent by reference to the drawings and by study of the following description.

BRIEF DESCRIPTION OF THE DRAWINGS

The disclosure will be readily understood by the following detailed description in conjunction with the accompanying drawings, wherein like reference numerals designate like structural elements, and in which.

The use of cross-hatching or shading in the accompanying figures is generally provided to clarify the boundaries between adjacent elements and also to facilitate legibility of the figures. Accordingly, neither the presence nor the absence of cross-hatching or shading conveys or indicates any preference or requirement for particular materials, material properties, element proportions, element dimensions, commonalities of similarly illustrated elements, or any other characteristic, attribute, or property for any element illustrated in the accompanying figures.

Additionally, it should be understood that the proportions and dimensions (either relative or absolute) of the various features and elements (and collections and groupings thereof) and the boundaries, separations, and positional relationships presented therebetween, are provided in the accompanying figures merely to facilitate an understanding of the various embodiments described herein and, accordingly, may not necessarily be presented or illustrated to scale, and are not intended to indicate any preference or requirement for an illustrated embodiment to the exclusion of embodiments described with reference thereto.

DETAILED DESCRIPTION

Reference will now be made in detail to representative embodiments illustrated in the accompanying drawings. It should be understood that the following description is not intended to limit the embodiments to one preferred embodiment. To the contrary, it is intended to cover alternatives, modifications, and equivalents as can be included within the spirit and scope of the described embodiments as defined by the appended claims.

An active optical sensor is an optical sensor that emits and senses its own light. Typically, the emitted light is limited to optical wavelengths within a narrow band. The narrow band may in some cases be selected to increase the likelihood that the optical wavelength(s) of the emitted light differ from ambient optical wavelengths and/or to increase the likelihood that the emitted light will penetrate a volume of interest (e.g., human tissue).

Figure 1:
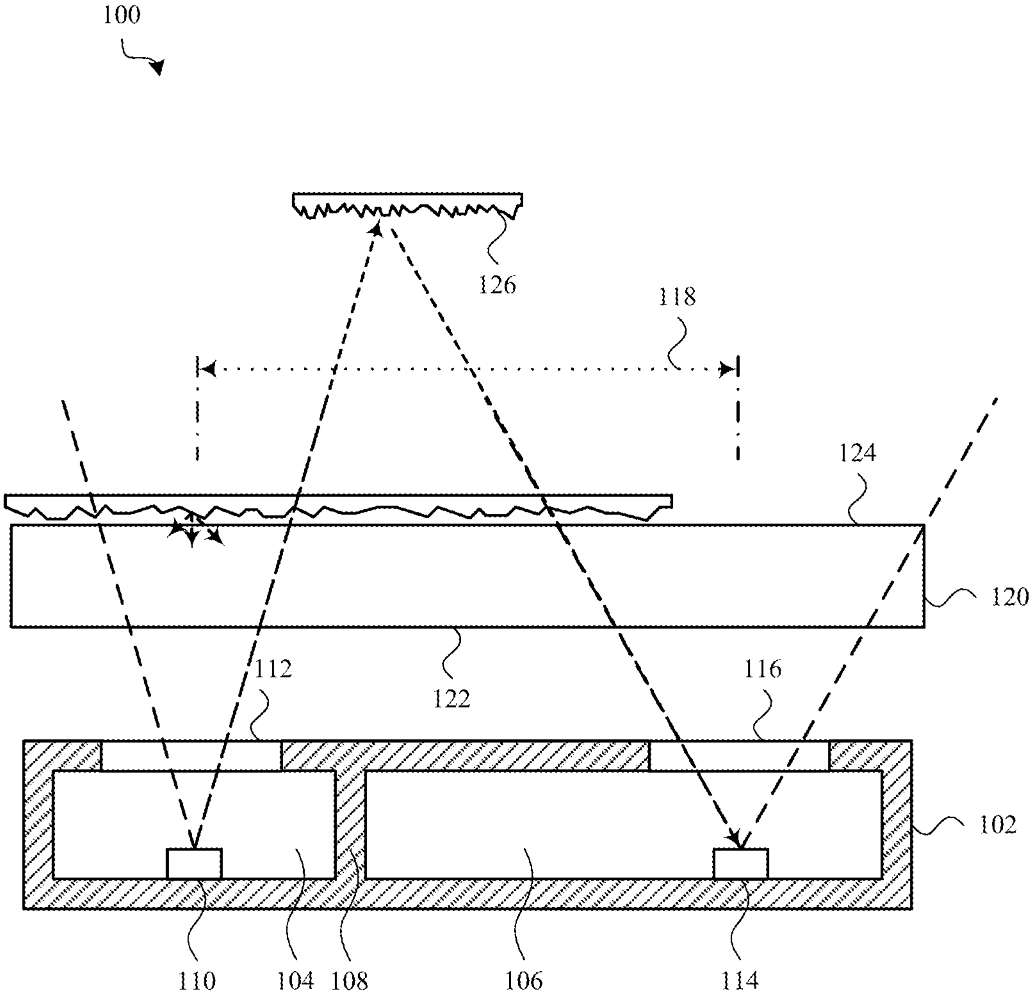
FIG. 1 shows an example bistatic optical sensor module.

Many active optical sensors are housed in dual-aperture (or "bistatic") optical sensor modules, an example of which is shown in FIG. 1. The bistatic optical sensor module 100 has a module housing 102 defining an emitter/transmitter (Tx) compartment 104 (a first compartment) and a detector/receiver (Rx) compartment 106 (a second compartment). The emitter and detector compartments 104, 106 may be optically isolated from one another by an optical barrier 108. The optical barrier 108 may, in some embodiments, include one or more walls or surfaces of the emitter and/or detector compartments 104, 106. The optical barrier 108 may also or alternatively include an optically opaque coating or treatment applied to the emitter and/or detector compartment 104, 106, or one or more structures inserted in the emitter or detector compartment 104, 106 or between the emitter and detector compartments 104, 106. In some embodiments, the optical barrier 108 may be opaque to only some wavelengths of light (e.g., opaque to one or more wavelengths of light emitted by the emitter(s) of the module 100) but translucent or transparent to other wavelengths of light.

The emitter compartment 104 may house an optical emitter 110 and have a first aperture 112. In various embodiments, the optical emitter 110 may take include a semiconductor light source, such as a vertical cavity surface-emitting laser (VCSEL), edge-emitting laser (EEL), horizontal cavity surface-emitting laser (HCSEL), vertical external-cavity surface-emitting laser (VECSEL), quantum-dot laser (QDL), quantum cascade laser (QCL), or light-emitting diode (LED) (e.g., an organic LED (OLED), resonant-cavity LED (RC-LED), micro LED (mLED), superluminescent LED (SLED), or edge-emitting LED). These light sources can provide coherent or partially coherent light sources.

The detector compartment 106 may house an optical detector 114 (e.g., a photodiode) and have a second aperture 116. The first and second apertures 112, 116 may be spaced apart from each other. In some embodiments, the optical barrier 108 may not only optically isolate the detector compartment 106 from the emitter compartment 104, but may also define a baseline (BL) separation 118 between the first and second apertures 112, 116. The BL separation 118 may be characterized, for example, in terms of the edge-to-edge distance between the first and second apertures 112, 116 or the center-to-center distance of the first and second apertures 112, 116.

A bistatic optical sensor module, such as the module 100, can be useful in that it reduces optical crosstalk (XT) between an optical emitter 110 and an optical detector 114. Optical crosstalk is defined herein as the amount of undesired light received by an optical detector 114, from an optical emitter 110, over one or more optical paths that do not include a reflection from (and in some cases a penetration into) a desired external target 126 (i.e., a target external to the module 100). Optical crosstalk may include various components, such as in-module crosstalk and system level crosstalk. In-module crosstalk includes light that travels directly from an optical emitter 110 to an optical detector 114. With a sufficiently large BL separation 118, in-module crosstalk can be greatly reduced or eliminated. System level crosstalk includes light that reflects off of objects that are not a desired external target 126. System level crosstalk may include, for example, light that reflects from a cover 120 (e.g., a glass, crystal, or plastic cover) positioned over the module 100. In some cases, light may reflect from an internal surface 122 of the cover 120 (e.g., at an air-to-glass interface), from an external surface 124 of the cover 120 (e.g., at a glass-to-air interface), from imperfections within the cover 120, or from particles in the air between the module 100 and the cover 120. In a bistatic optical sensor module, system level crosstalk is typically the major aggressor and limiter of system performance.

In a photometric sensing system such as an optical proximity sensor, an optical fingerprint sensor, or a two-dimensional (2D) camera with active illumination, a bistatic optical sensor module can help distinguish a target signal from optical crosstalk. A bistatic optical sensor module may also reduce the need for (or frequency of) optical crosstalk calibrations to establish a baseline optical detector signal for a "no target" condition. In other words, a bistatic optical sensor module can help reduce sensor drift. In the case of an image sensor or time-of-flight sensor (e.g., an optical sensor that uses one or more single-photon avalanche detectors (SPADs)), a bistatic optical sensor module can reduce optical crosstalk that tends to saturate the dynamic range of a sensor pixel before a photon reflected from a desired external target is detected.

In general, increasing the BL separation 118 of the module 100, and/or reducing the field of view (FoV) of the optical emitter 110 or optical detector 114, tends to reduce the near field optical crosstalk of the module 100. However, increasing the BL separation 118 also tends to reduce the ability of the module 100 to detect near field targets. At times, it may be desirable to deploy an optical sensor module that can be used for both near field and far field optical sensing. Far field sensing applications may include, for example, far field imaging, far field distance detection or depth map generation, navigation applications, particle concentration determination, and so on. Near field sensing applications may include, for example, device proximity detection (e.g., for device wake/sleep determinations), optical touch sensing, fingerprint sensing, and so on.

Described herein with reference to FIGS. 1-16 are systems, methods, apparatuses, and devices that, in some cases, add or improve the near field optical sensing capability (e.g., target detection) of a bistatic optical sensor module and/or provide other optical sensing advantages. However, those skilled in the art will readily appreciate that the detailed description given herein with respect to these figures is for explanatory purposes only and should not be construed as limiting.

Directional terminology, such as "top", "bottom", "upper", "lower", "front", "back", "over", "under", "above", "below", "left", or "right" is used with reference to the orientation of some of the components in some of the figures described below. Because components in various embodiments can be positioned in a number of different orientations, directional terminology is used for purposes of illustration only and is usually not limiting. The directional terminology is intended to be construed broadly, and therefore should not be interpreted to preclude components being oriented in different ways. Also, as used herein, the phrase "at least one of" preceding a series of items, with the term "and" or "or" to separate any of the items, modifies the list as a whole, rather than each member of the list. The phrase "at least one of" does not require selection of at least one of each item listed; rather, the phrase allows a meaning that includes at a minimum one of any of the items, and/or at a minimum one of any combination of the items, and/or at a minimum one of each of the items. By way of example, the phrases "at least one of A, B, and C" or "at least one of A, B, or C" each refer to only A, only B, or only C; any combination of A, B, and C; and/or one or more of each of A, B, and C. Similarly, it may be appreciated that an order of elements presented for a conjunctive or disjunctive list provided herein should not be construed as limiting the disclosure to only that order provided.

Figure 2:
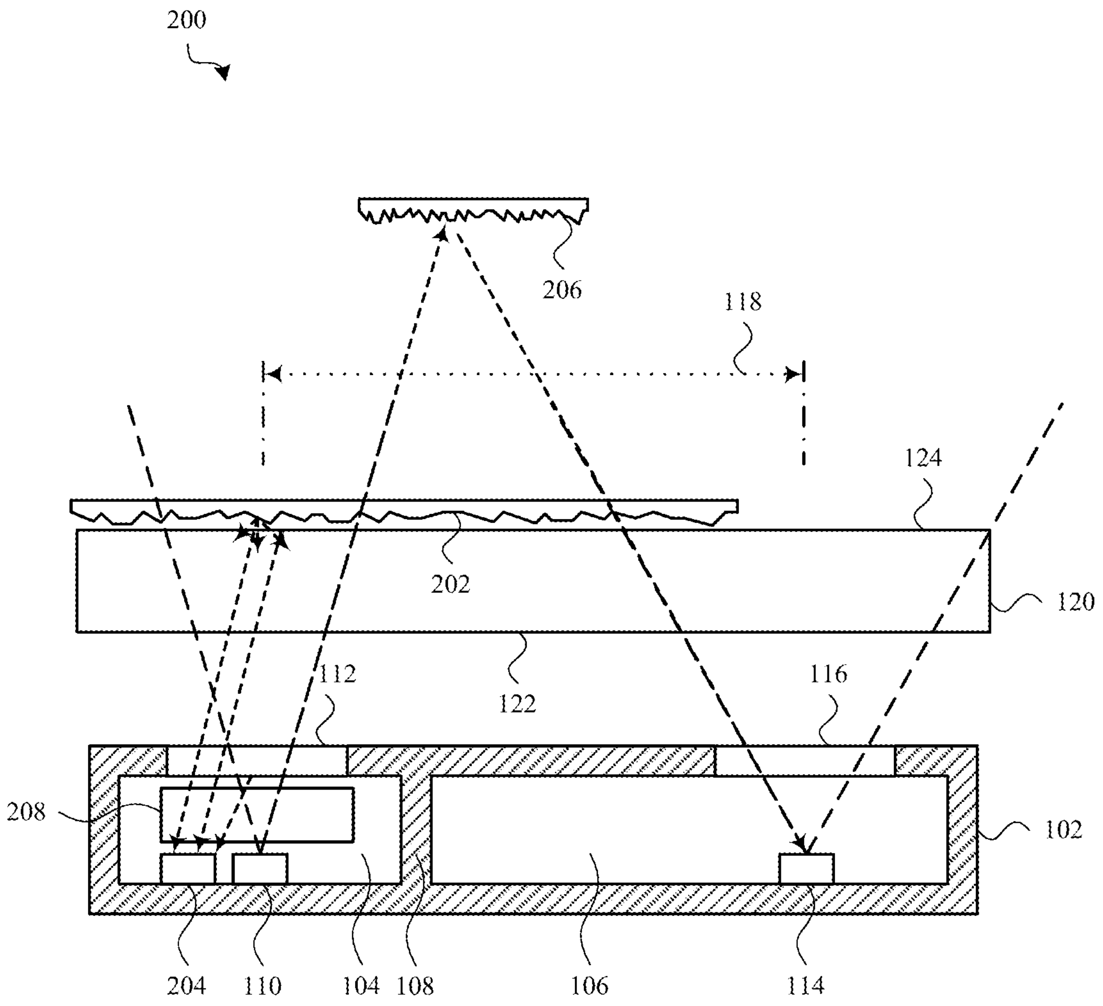
FIG. 2 shows an example bistatic optical sensor module with improved near field optical sensing.

FIG. 2 shows an example bistatic optical sensor module 200 with improved near field optical sensing. The module 200 may be constructed similarly to the module described with reference to FIG. 1, but more generally may include a set of one or more optical emitters disposed in the emitter compartment 104 and configured to emit light through the first aperture 112. The set of optical emitter(s) may include the optical emitter 110.

The module 200 may also include a first set of one or more optical detectors disposed in the emitter compartment 104 and configured to receive a first redirected portion of the emitted light through the first aperture 112 (e.g., a first redirected portion of the light emitted by the first optical emitter 110, such as a portion of the light that reflects from a near field target 202). The first set of optical detector(s) may include an optical detector 204. The module 200 may further include a second set of one or more optical detectors disposed in the second compartment 106 and configured to receive a second redirected portion of the emitted light through the second aperture 116 (e.g., a second redirected portion of the light emitted by the first optical emitter 110, such as a portion of the light that reflects from a far field target 206). The second set of optical detector(s) may include the optical detector 114.

In contrast to the bistatic optical sensor module described with reference to FIG. 1, the optical detector 204 in the emitter compartment 104 provides improved near field optical sensing for the module 200—e.g., near field optical sensing that is not affected by the BL separation 118.

A set of one or more optical elements 208 may be disposed in the emitter compartment 104 and configured to direct at least a portion of the emitted light (e.g., the light emitted by the optical emitter 110) and/or the first redirected portion of the emitted light (e.g., the light reflected from the near field target 202 and received through the first aperture 112). In some embodiments, the optical element(s) 208, or a subset or portions of the optical element(s) 208, may provide a shared optical emission/reception path (e.g., shared beam-shaping optics) for the optical emitter 110 and the optical detector 114.

Figure 3:
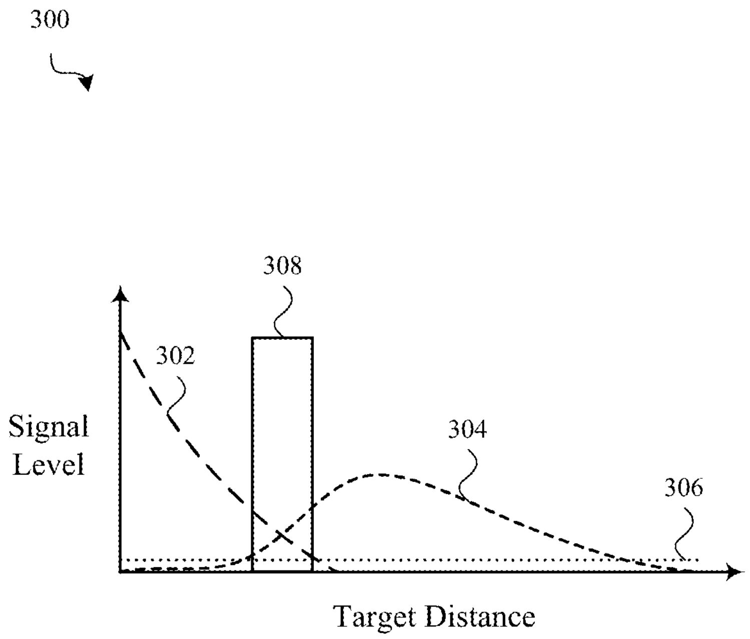
FIG. 3 shows an example graph of optical detector signal strength for objects detected at various distances by the module described with reference to FIG. 2.

FIG. 3 shows an example graph 300 of optical detector signal strength (Signal Level, on the y-axis) for objects detected at various distances (Target Distance, on the x-axis) by the module 200 described with reference to FIG. 2. The graph 300 includes a first curve 302 representing the signal strength of the near field optical detector 204 when objects are detected at various near field distances, and a second curve 304 representing the signal strength of the far field optical detector 114 when objects are detected at various far field distances. As shown, the first curve 302 decays within a near field range of distances and is strongest at a "zero" distance. In contrast, the second curve 304 begins to rise from zero at a positive distance from the module 200 and may have a pseudo-bell curve shape.

Because the near field optical detector 204 does not benefit from the BL separation 118 of the far field optical detector 114 from the optical emitter 110, the optical module 200 may be designed such that the signal strengths associated with the first curve 302 exceed a no-target self-talk level 306 within a near field detection range, and exceed the no-target self-crosstalk level 306 sufficiently that the presence of a near field object can be distinguished from the self-talk level 306.

To ensure that objects can be detected within a continuous range of distances from the module 200, the module 200 may be designed such that the first and second curves 302, 304 overlap. A processor that receives the outputs of the optical detectors 204 and 114 may be configured to use one, the other, or both optical detector outputs to determine the presence, distance, and/or other characteristics of an object within a mid-field zone 308 of distances from the module 200.

Figure 4:
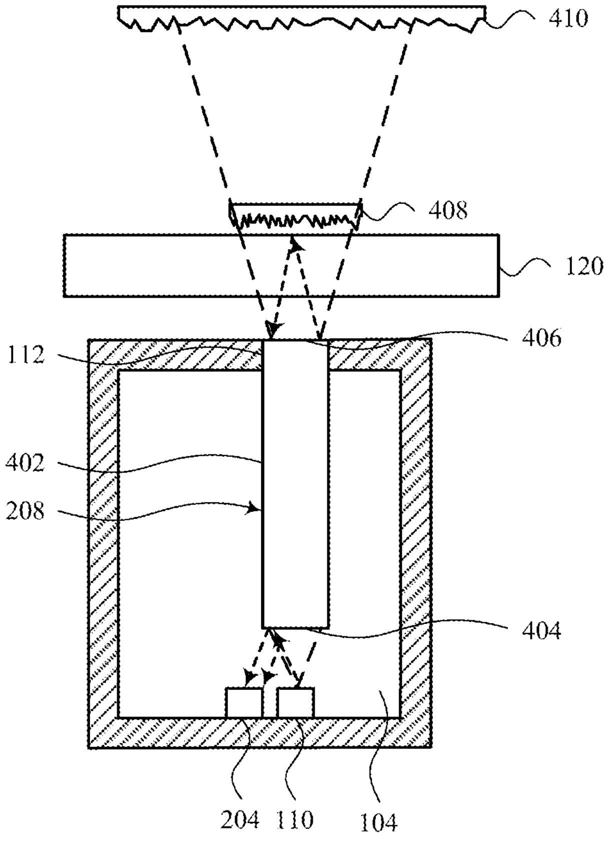
FIG. 4 shows a first alternative embodiment of components housed within an emitter compartment of a bistatic optical sensor module such as the bistatic optical sensor module described with reference to FIG. 2.

FIG. 4 shows a first alternative embodiment of components housed within an emitter compartment 104 of a bistatic optical sensor module such as the bistatic optical sensor module described with reference to FIG. 2. The components include an optical emitter 110, an optical detector 204, and a set of one or more optical elements 208.

By way of example, the set of optical element(s) 208 is shown to include a light pipe 402 or other optical element that receives light emitted by the optical emitter 110 through a first surface 404 of the light pipe 402 and directs the light through a second surface 406 of the light pipe 402. The second surface 406 of the light pipe 402 may be positioned near or within an aperture 112 of the emitter compartment 104, and may direct the light emitted by the optical emitter 110 through the aperture 112.

In some embodiments, the optical emitter 110 may only emit light, and the optical detector 204 may detect redirected portions of the light. In some embodiments, the optical emitter 110 and optical detector 204 may form parts of a self-mixing interferometry (SMI) sensor including the optical emitter 110 and the optical detector 204. In these embodiments, the SMI sensor may be used to detect the presence, movement, and/or distance of a target. In some of these embodiments, an additional optical detector may be positioned adjacent the SMI sensor. One of the optical detectors may be used for detecting light returned from a target, and one of the optical detectors may be used to monitor the power of the emitted light (e.g., for the purpose of regulating the power of the SMI sensor and/or cutting power to the SMI sensor when a laser of the SMI sensor is operating outside defined parameters).

Light emitted from the second surface 406 of the light pipe 402 may be redirected from (e.g., reflect or backscatter from) a target 408 or 410, be received into the light pipe 402 via the second surface 406, be directed through the light pipe 402 toward the first surface 404, and be received by the optical detector 204, which optical detector 204 may be positioned near the optical emitter 110. However, light that is emitted from the second surface 406 of the light pipe 402 and returned from a reflective target, or from a system component such as a specular cover 120, may saturate the optical detector 204 and prevent the detection of other targets or, in the case of a system component, prevent the detection of an intended external target.

Figure 5:
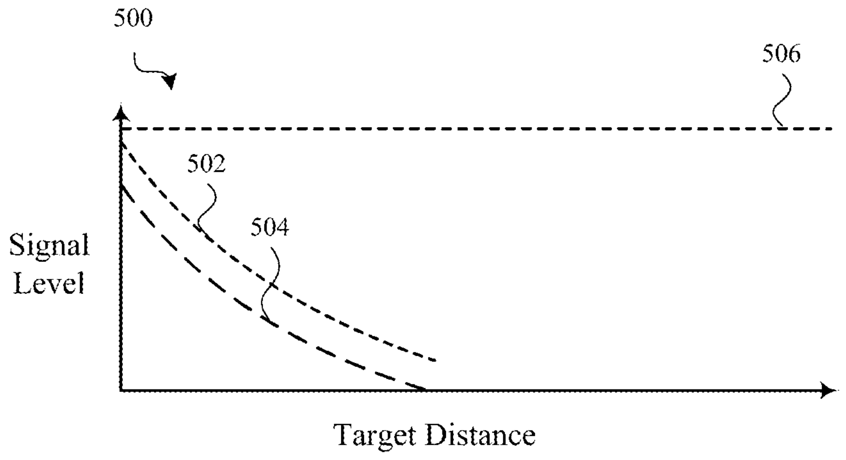
FIG. 5 shows an example graph of optical detector strength for objects detected at various distances by the optical detector in the emitter compartment described with reference to FIG. 4.

FIG. 5 shows an example graph 500 of optical detector strength (Signal Level, on the y-axis) for objects detected at various distances (Target Distance, on the x-axis) by the optical detector 204 in the emitter compartment described with reference to FIG. 4. The graph 500 includes a first curve 502 representing the signal strength when light is redirected toward the optical detector 204 from a dark specular target, and a second curve 504 representing the signal strength when light is redirected toward the optical detector 204 from a dark diffusing target. FIG. 5 also shows a system no-target self-crosstalk level 506, which may in some cases saturate the optical detector 204 as a result of specular reflections (of emitted light) off of the cover 120.

Figure 6:
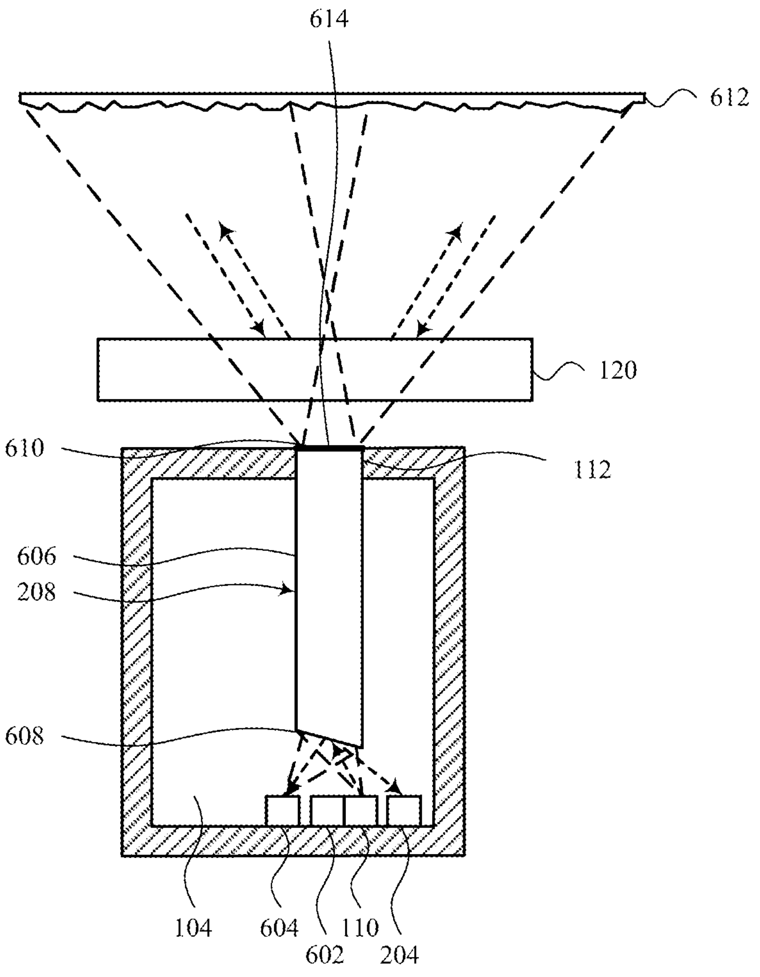
FIG. 6 shows a second alternative embodiment of components housed within an emitter compartment of a bistatic optical sensor module such as the bistatic optical sensor module described with reference to FIG. 2.

FIG. 6 shows a second alternative embodiment of components housed within an emitter compartment 104 of a bistatic optical sensor module such as the bistatic optical sensor module described with reference to FIG. 2. The components include a first optical emitter 110, a second optical emitter 602, a first optical detector 204, an optional second optical detector 604, and a set of one or more optical elements 208.

By way of example, the set of optical element(s) 208 is shown to include a light pipe 606 or other optical element that receives light emitted by the optical emitters 110, 602 through a first surface 608 of the light pipe 606 and directs the light through a second surface 610 of the light pipe 606. The second surface 610 of the light pipe 606 may be positioned near or within an aperture 112 of the emitter compartment 104, and may direct the light emitted by the optical emitters 110, 602 through the aperture 112.

The first surface 608 of the light pipe 606 may receive a first light emitted by the first optical emitter 110 at a range of acute incident angles, and preferably not at a 90 degree incident angle (e.g., the optical emitter 110 may be a high angle coupling emitter). This may be achieved, in some embodiments, by 1) forming the light pipe 606 with a chamfer or the like, such that the first surface 608 forms other than a right angle with the sidewall of a cylindrical light pipe 606, and such that the first surface 608 is tilted at a non-right angle with respect to an axis of the light emitted by the first optical emitter 110, and/or 2) offsetting an axis of the first optical emitter 110 from an axis of the light pipe 606. The received first light may then reflect within the light pipe 606 and exit the second surface 610 of the light pipe 606 in a Lambertian distribution, instead of passing straight through from the first surface 608 to the second surface 610. After reflecting from a target 612, a Lambertian-reflected portion of the first light may enter the second surface 610 of the light pipe 606 and be directed toward the first optical detector 204. The first optical detector 204 may receive light passing through the first surface 608 of the light pipe 606 at a range of acute incident angles, and preferably not at a 90 degree incident angle. In some cases, the first optical detector 204 may also have an axis that is offset from the axis of the light pipe 606. In this manner, the light pipe 606 can mitigate (or prevent) impingement of a specular-reflected second portion of the first light on the first optical detector 204 (i.e., the specular reflection experienced by the optical detector described with reference to FIGS. 4 and 5 can be mitigated or prevented). To further mitigate impingement of a specular-reflected second portion of the first light on the first optical detector 204, an anti-reflective coating (ARC) 614 may be applied to the second surface 610 of the light pipe 606, or the second surface 610 may be treated so that it is less reflective to emitted light passing through the light pipe 606. In some embodiments, the set of one or more optical elements described with reference to FIG. 2, 4, or other figures may include a chamfered first surface and/or ARC or surface treatment that function similarly to the chamfered first surface 608, ARC 614, or surface treatment described with reference to FIG. 6.

A second light emitted by the second optical emitter 602 may be received at the first surface 608 of the light pipe 606 along the axis of the light pipe 606 and/or at a range of incident angles that have a smaller variation from perpendicular than the range of incident angles at which the first light is received into the light pipe 606 from the first optical emitter 110. In some embodiments, some of the second light may be received at the first surface 608 at a perpendicular angle. In this manner, some or all of the first light may pass through the light pipe 606 without reflecting off the sidewalls of the light pipe 606 and/or with fewer reflections within the light pipe 606 than the first light emitted by the first optical emitter 110 (e.g., the second light may be directed into an emission field that is different from an emission field of the first light). Similarly, the optional second optical detector 604 may receive a specular-reflected portion of the second light. The specular-reflected portion may reflect, for example, from a specular cover 120. The optional second optical detector 604 may be used, for example, to monitor the power of the emitted second light. However, the primary purpose of the emitted second light is to be returned from a far field target for detection by an optical detector disposed in a detector compartment of the bistatic optical sensor module.

Figure 7:
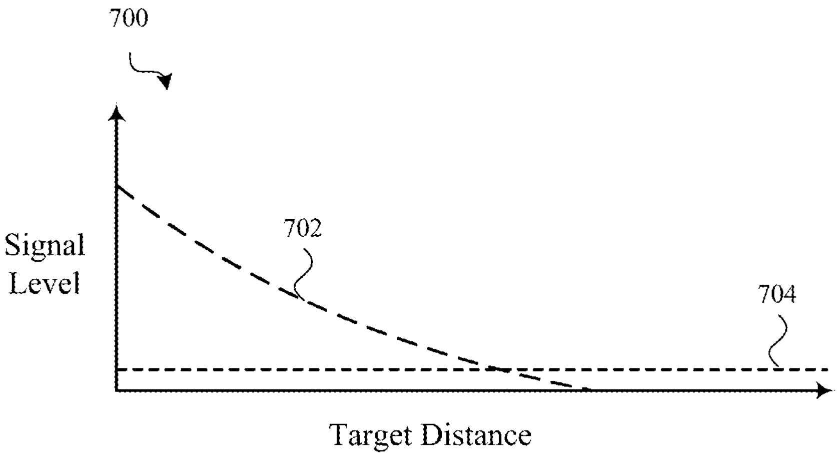
FIG. 7 shows an example graph of optical detector strength for objects detected at various distances by the first optical detector in the emitter compartment described with reference to FIG. 6.

FIG. 7 shows an example graph 700 of optical detector strength (Signal Level, on the y-axis) for objects detected at various distances (Target Distance, on the x-axis) by the first optical detector 204 in the emitter compartment described with reference to FIG. 6. The graph 700 includes a curve 702 representing the signal strength when light is redirected toward the first optical detector 204 from a dark diffusive target. FIG. 7 also shows a system no-target self-crosstalk level 704, which is no-target self-crosstalk level 704 is greatly reduced compared to the no-target self-crosstalk level shown in FIG. 5 for the emitter compartment described with reference to FIG. 4.

Figure 8:
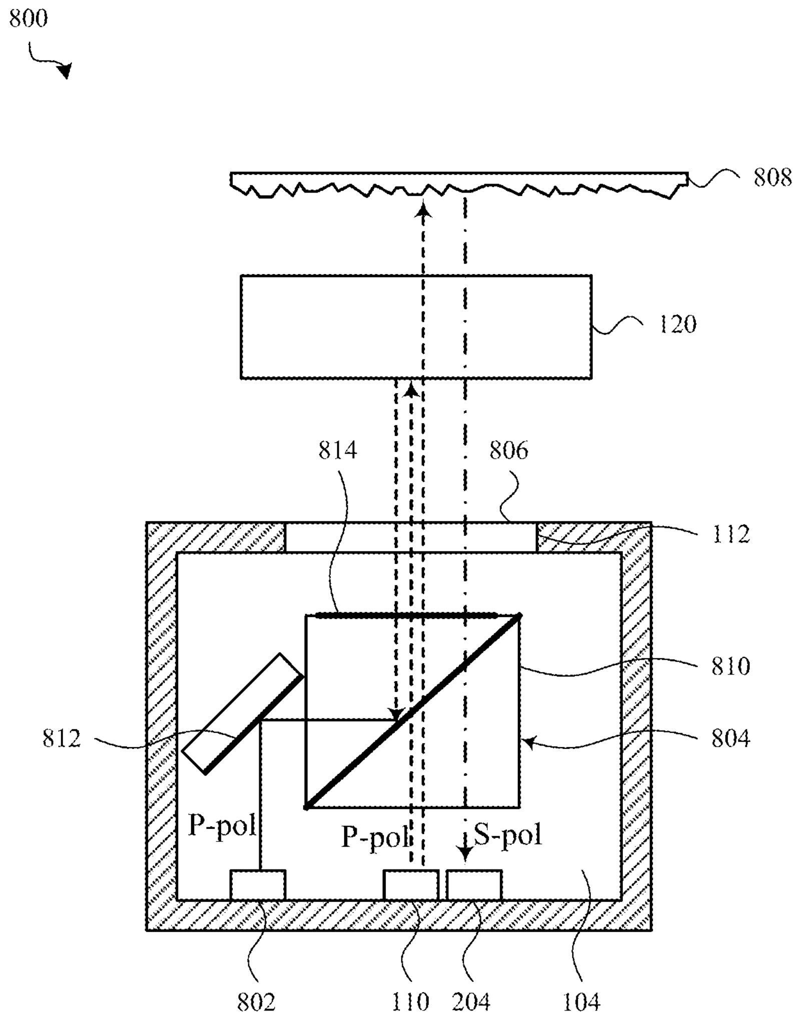
FIG. 8 shows a third alternative embodiment of components housed within an emitter compartment of a bistatic optical sensor module such as the bistatic optical sensor module described with reference to FIG. 2.

FIG. 8 shows a third alternative embodiment of components housed within an emitter compartment 104 of a bistatic optical sensor module such as the bistatic optical sensor module described with reference to FIG. 2. The components include an optical emitter 110, a first optical detector 204, an optional second optical detector 802, and a set of one or more polarization-dependent optical elements 804.

The polarization-dependent optical element(s) 804 may receive light emitted by the optical emitter 110, emit light having a first polarization through an aperture 112 in the emitter compartment 104, and pass light received through the aperture 112 and having a second polarization (and, in some cases, only light received through the aperture 112 and having the second polarization) toward the first optical detector 204.

In some embodiments, the optical emitter 110 may emit light having the first polarization (e.g., P-polarized (P-pol) light or left (L) circular polarized light). The emitted light (e.g., P-pol light) may be received by the polarization-dependent optical element(s) 804 and directed through the aperture 112 in the emitter compartment 104. In some embodiments, the polarization-dependent optical element(s) 804 may include a quarter wave plate 806 positioned in the path of the emitted light, in or near the aperture 112. Light that exits the emitter compartment 104 may need to pass through a specular cover 120 before it can reflect or backscatter from an intended target 808 that is external to the device including the bistatic optical sensor module. Some of the light emitted by the optical emitter 110 may reflect from the specular cover 120, be returned through the aperture 112, and be received by the polarization-dependent optical element(s) 804. Some of the light emitted by the optical emitter 110 may reflect or backscatter from the target 808, be returned through the aperture 112, and be received by the polarization-dependent optical element(s) 804. Specular reflected light will have the same polarization as the emitted light (e.g., P-pol). If the target 808 has a diffusive surface or volume, the light returned from the target 808 will have a scrambled polarization and may include, for example, light having the first polarization and light having a second polarization (e.g., P-pol light and S-polarized (S-pol) or right (R) circular polarized light).

If the polarization-dependent optical element(s) 804 include an optical beam splitter 810, the optical beam splitter 810 may direct the light that is received through the aperture 112 and has the second polarization (e.g., S-pol light) (and, in some cases, only the light that is received through the aperture 112 and has the second polarization) toward the first optical detector 110. The optical beam splitter 810 may optionally direct the light that is received through the aperture 112 and has the first polarization (e.g., P-pol light) (and, in some cases, only the light that is received through the aperture 112 and has the first polarization) toward the optional second optical detector 802. In some embodiments, the optical beam splitter 810 may direct the light having the first polarization toward a mirror 812, which mirror 812 assists in directing the light having the first polarization toward the second optical detector 802.

In some embodiments, a surface of the polarization-dependent optical element(s) 804 and/or beam splitter 810 through which light passes before leaving the aperture 112 may include an ARC 814.

A processor that receives the output of the first optical detector 110 may be configured to detect a target 808 having a diffusive surface or volume by determining an amount of light received by the first optical detector 110 alone. Alternatively, the processor may receive the outputs of the first and second optical detectors 110, 802 and be configured to detect a target 808 having a diffusive surface or volume by determining a first amount of light received by the first optical detector 110; determining a second amount of light received by the second optical detector 802; comparing the first amount of light to the second amount of light (e.g., to determine a ratio of the first and second amounts of light); and determining, from the comparison, a presence and/or proximity of an object.

Figure 9:
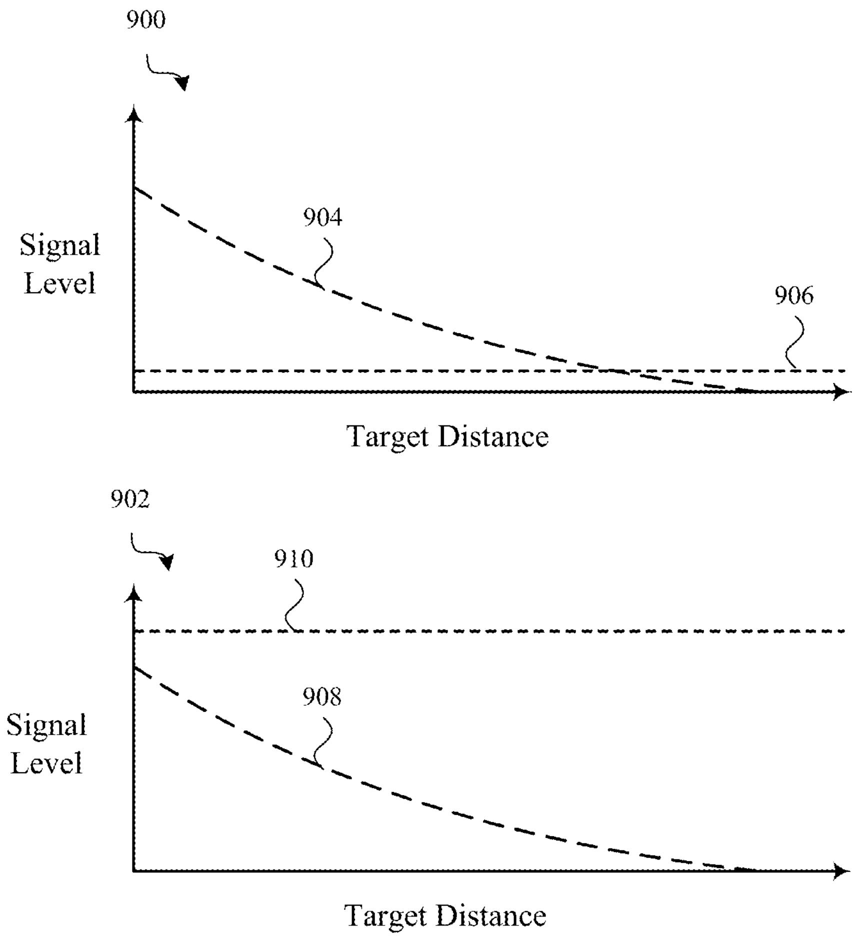
FIG. 9 shows an example set of graphs of optical detector strength for objects detected at various distances by the first and second optical detectors in the emitter compartment described with reference to FIG. 8.

FIG. 9 shows an example set of graphs 900, 902 of optical detector strength (Signal Level, on the y-axis) for objects detected at various distances (Target Distance, on the x-axis) by the first and second optical detectors 204, 802 in the emitter compartment described with reference to FIG. 8. The graph 900 includes a curve 904 representing the signal strength when S-pol light is redirected toward the first optical detector 204 from a dark diffusive target. Graph 900 also shows a system no-target self-crosstalk level 906 for the first optical detector 204. The graph 902 includes a curve 908 representing the signal strength when P-pol light is redirected toward the second optical detector 602 from a dark diffusive target. Graph 902 also shows a system no-target self-crosstalk level 910 for the second optical detector 602. As shown, the no-target self-crosstalk level 906 for the first (S-pol) optical detector 204 is much lower than the no-target self-crosstalk level 910 for the second (P-pol) optical detector 602.

Figure 10:
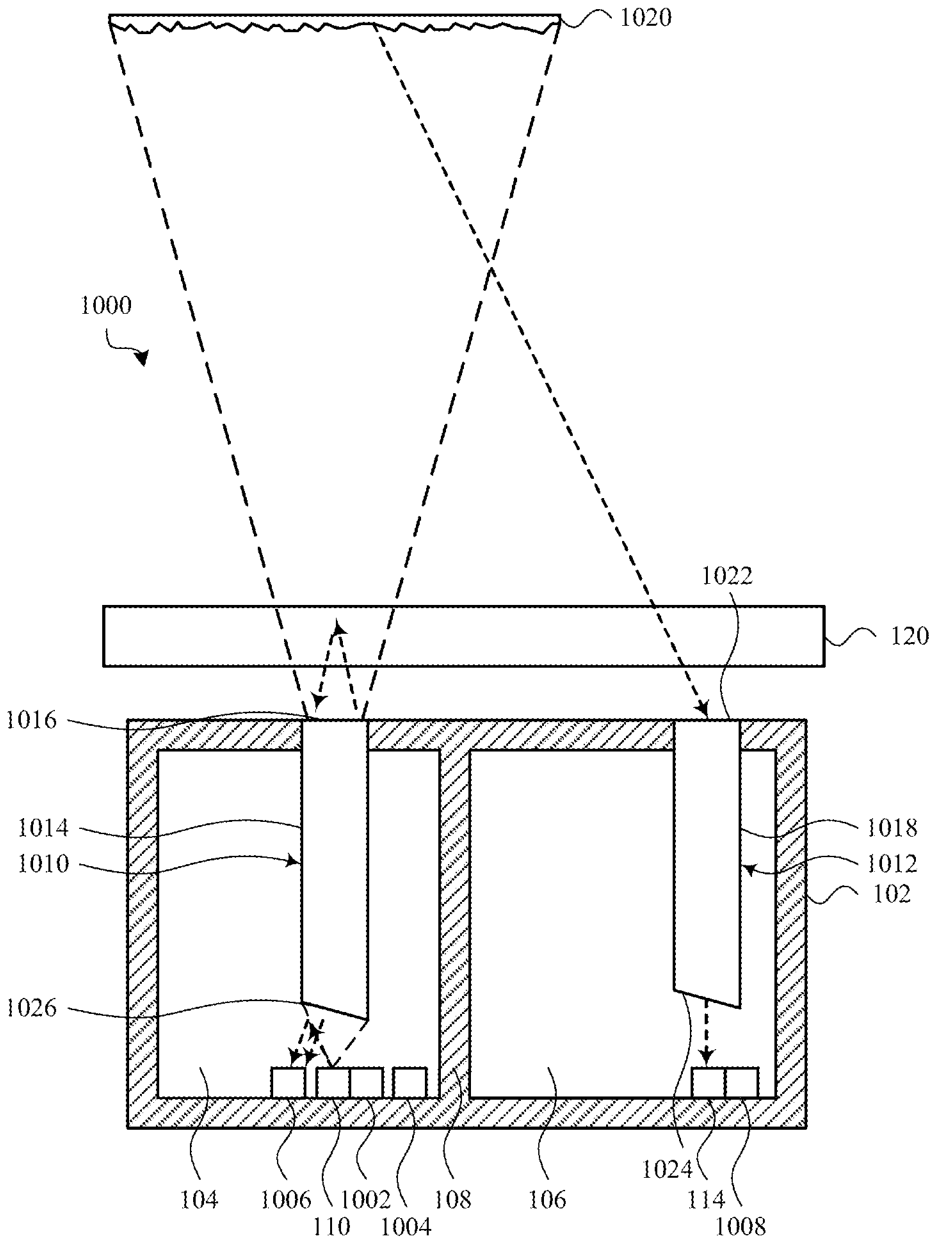
FIGS. 10-12 show another example bistatic optical sensor module.

FIG. 10 shows another example bistatic optical sensor module 1000. The module 1000 shares features with the module described with reference to FIG. 2.

In addition to the optical emitter 110, the emitter compartment 104 may include another optical emitter 1002, a first optical detector 1004, and a second optical detector 1006. The optical emitter 1002 may be configured similarly to the first optical emitter described with reference to FIG. 6, and the optical emitter 110 may be configured similarly to the second optical emitter described with reference to FIG. 6. The first and second optical detectors 1004, 1006 may be configured similarly to the first and second optical detectors described with reference to FIG. 6, but may be implemented as single-photon avalanche detectors (SPADs) or other types of time-of-flight (ToF) sensors.

In addition to the optical detector 114 (a third optical detector), the detector compartment 106 may include a fourth optical detector 1008. Each of the third and fourth optical detectors 114, 1008 may also be implemented as SPADs or other types of ToF sensors.

Each of the emitter compartment 104 and the detector compartment 106 may include a respective set of one or more optical elements 1010, 1012. The optical element(s) 1010 disposed in the emitter compartment 104 may include a light pipe 1014 and ARC 1016 that are configured similarly to the optical element(s) described with reference to FIG. 6.

The optical element(s) 1012 disposed in the detector compartment 106 may include a light pipe 1018 or other optical element that receives light returned from a target 1020 through a first surface 1022 of the light pipe 1018 and directs the returned light through a second surface 1024 of the light pipe 1018. The first surface 1022 of the light pipe 1018 may be positioned near or within the second aperture 116 of the emitter compartment 104, and may receive light through the aperture 116.

The second surface 1024 of the light pipe 1018 may be shaped and oriented similar to an emitted light-receiving surface 1026 of the light pipe 1014. Light exiting the second surface 1024 of the light pipe 1018 may be received by the third optical detector 114 within a first range of emission angles. In some embodiments, the first range of emission angles may include a perpendicular angle. Light exiting the second surface 1024 of the light pipe 1018 may be received by the fourth optical detector 1008 within a second range of emission angles that differs from the first range of emission angles. The fourth optical detector 1008 may be a higher angle coupling detector than the third optical detector 114.

In operation, the first and second optical emitters 1002, 110 may respectively function as near and far field optical emitters, and the first, fourth, and third optical detectors 1004, 1008, 114 may respectively function as near, mid, and far field optical detectors. The near field optical emitter 1002 and near field optical detector 1004 may function similarly to the first optical emitter and first optical detector described with reference to FIG. 6, with a difference being that the near field optical emitter 1002 may be pulsed, and the near field optical detector 1004 may detect a ToF of one or more optical pulses. The optical element(s) 1012 may receive a returned portion of light emitted by the far field optical emitter 110 under some conditions (i.e., a portion of the emitted light that is returned from a target) and direct the light toward the far field optical detector 114. The optical element(s) 1012 may receive a returned portion of light emitted by the near field optical emitter 1002 (i.e., a portion of the emitted light that is returned from a target) and direct the light toward the mid field optical detector 1008.

Figure 11:
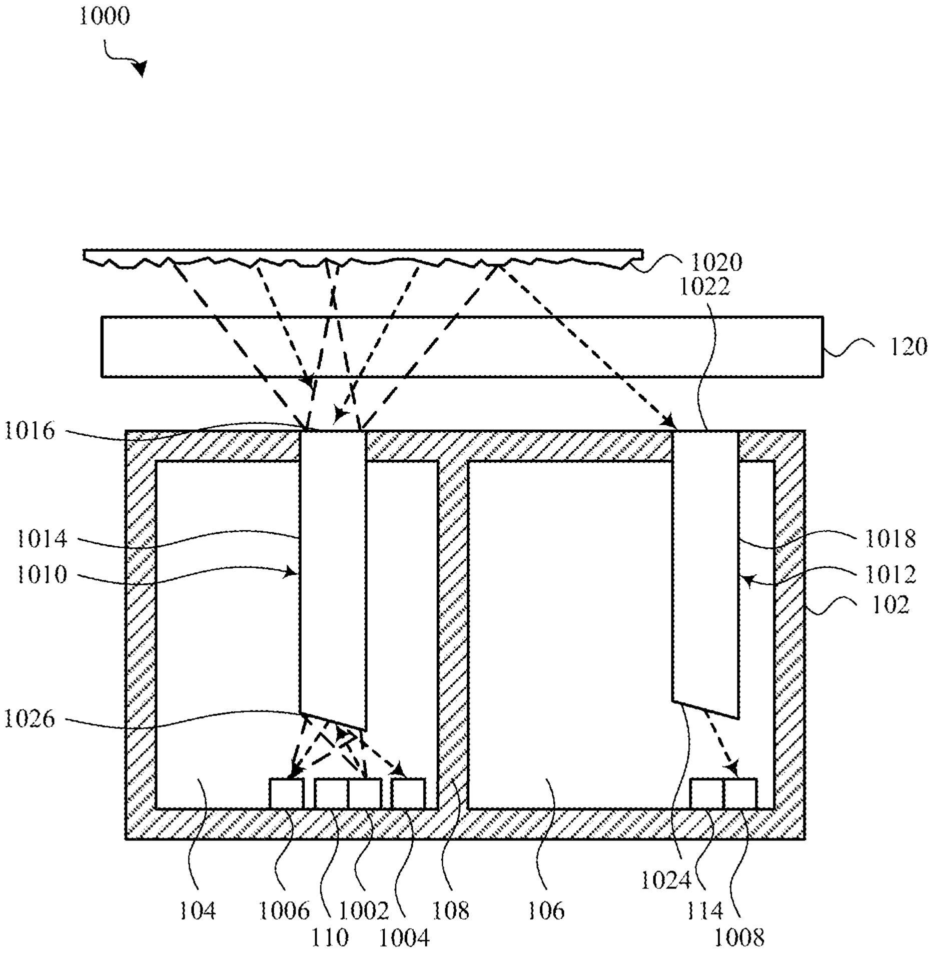
Figure 12:
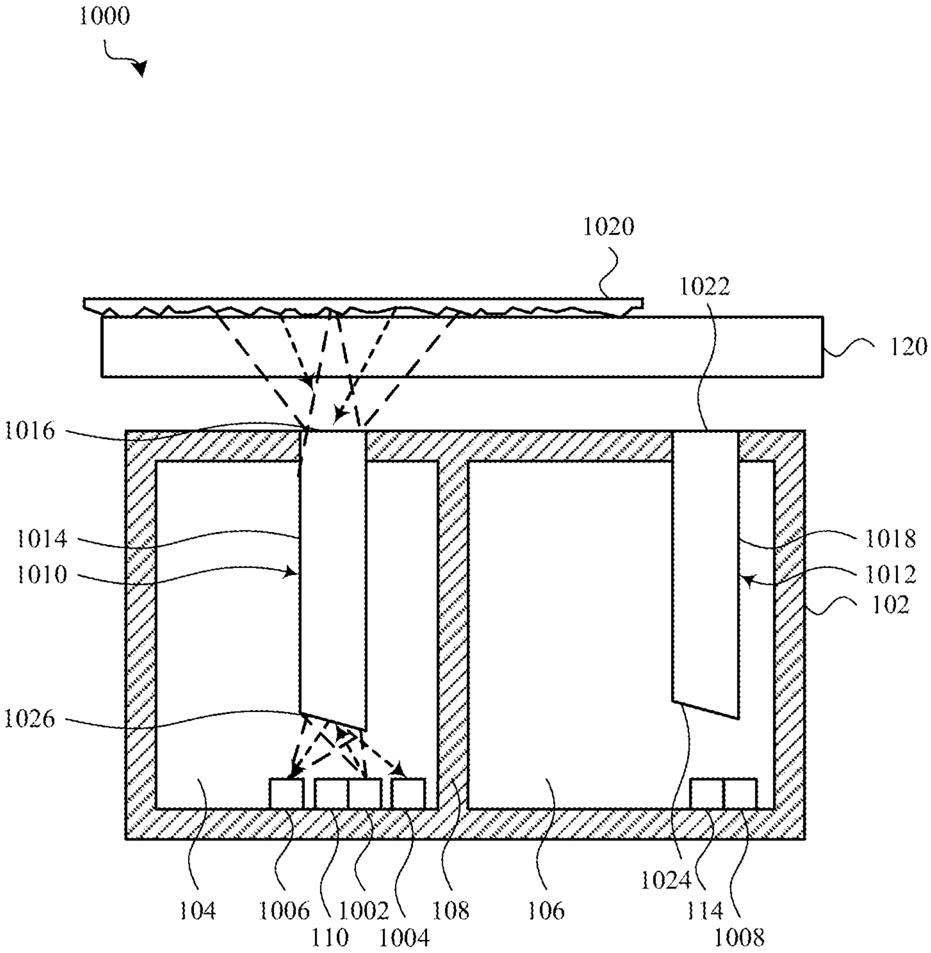

In some embodiments, the module 1000 may be operated as shown with reference to FIGS. 10-12. Initially, and as illustrated in FIG. 10, a processor that controls the near and far field optical emitters 1002, 110 and receives the outputs of the optical detectors 1004, 1008, 114, 1006 may cause the far field optical emitter 110 to emit a series of pulses and cause the far field optical detector 114 to monitor for returns of the pulses. When there is no target 1020 for the pulses to reflect from, the far field optical detector 114 will not produce a signal or may produce randomly triggered signals that are not tied to the emission of pulses by the far field optical emitter 110. Optionally, the second optical detector 1006 may be used as a reference SPAD to perform baselining (e.g., to determine a distance to a cover 120, of a device including the module 1000, through which the module 1000 emits and receives light). When a target 1020 is detected (e.g., when the far field optical detector 114 produces signals corresponding to ToFs suggesting a target is within the module's far field), the processor may determine a distance to the target 1020 using the ToFs (e.g., using a histogram of ToFs for different pulses). The processor may also determine whether the target 1020 is moving closer to the module 1000 and, if the target 1020 enters a mid field of the module 1000, the processor may cause the far field optical emitter 110 to cease its pulse transmission and cause the near field optical emitter 1002 to emit a series of pulses. The processor may also cause the near and/or mid field optical detectors 1004, 1008 to monitor for returned pulses.

As shown in FIGS. 11 and 12, pulses emitted by the near field optical emitter 1002 may be received by the near field optical detector 1004 or mid field optical detector 1008, depending on a distance between the module 1000 and the target 1020. If the target 1020 is in the mid field of the module 1000 (see FIG. 11), at least some of the pulses may be returned from the target 1020 and received at the mid field optical detector 1008. ToFs of the pulses detected at the mid field optical detector 1008 may be used by the processor to determine a distance to the target 1020. If the target 1020 is in the near field of the module 1000 (see FIG. 12), at least some of the pulses may be returned from the target 1020 and received at the near field optical detector 1004. ToFs of the pulses detected at the near field optical detector 1004 may be used by the processor to determine a distance to the target 1020. If the processor determines that the target 1020 is moving away from the module 1000, the processor may cause the near field optical emitter 1002 to cease its pulse transmission and cause the far field optical emitter 110 to emit a series of pulses. The processor may also cause the far field optical detector 114 to monitor for returned pulses.

Figure 13:
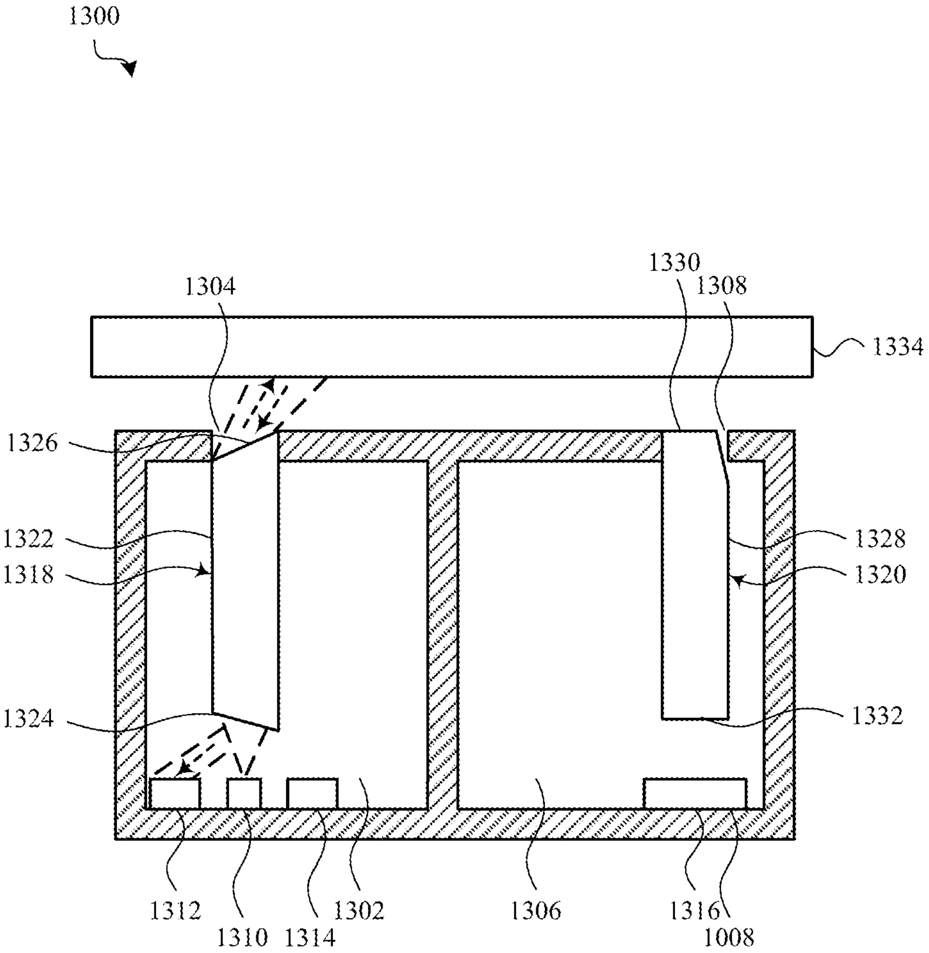
FIGS. 13-15 show another example bistatic optical sensor module.
Figure 14:
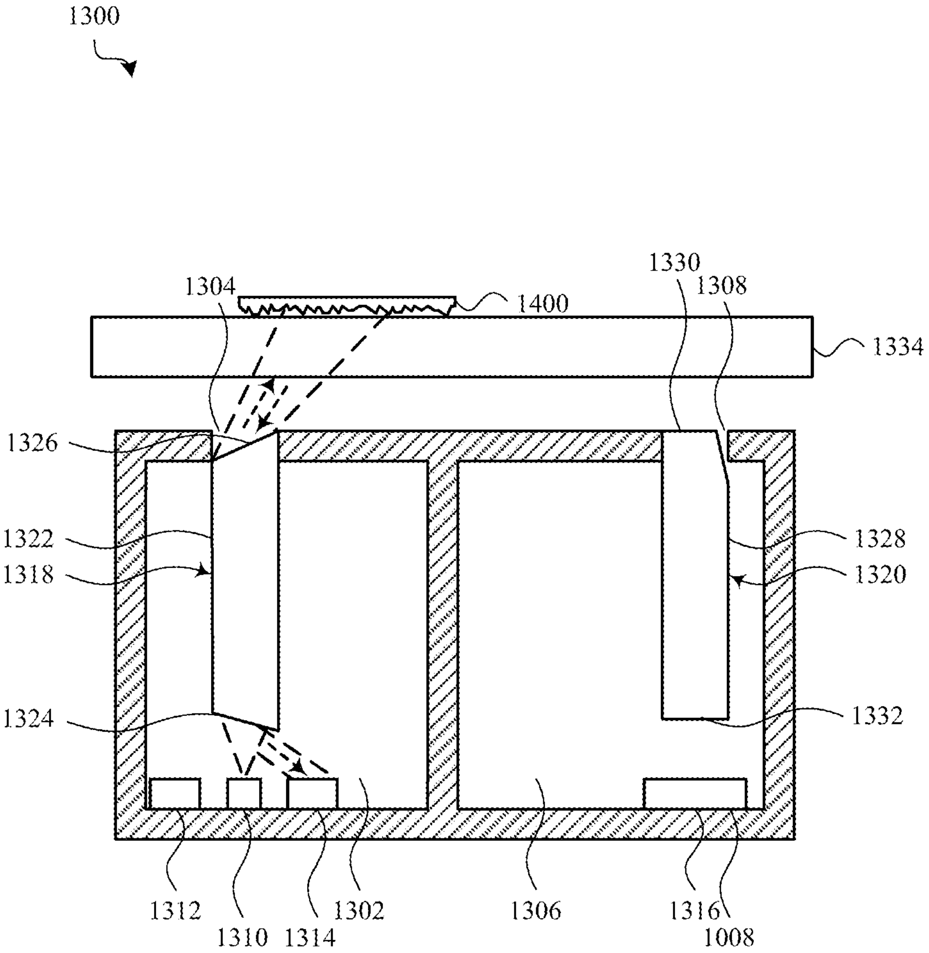
Figure 15:
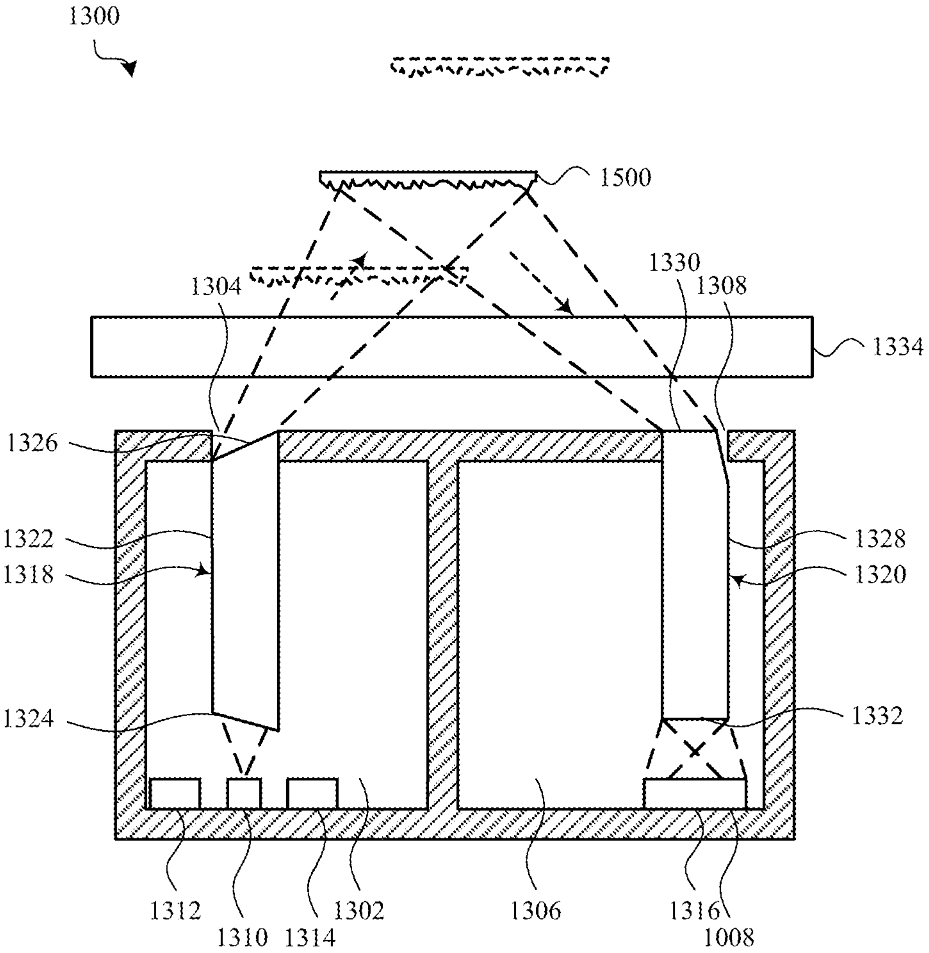

FIG. 13-15 show another example bistatic optical sensor module 1300. The module 1300 shares features with the module described with reference to FIG. 2.

The module 1300 includes an emitter compartment 1302 having a first aperture 1304 and a detector compartment 1306 having a second aperture 1308. The first and second apertures 1304, 1308 are separated by a BL separation.

An optical emitter 1310, a first optical detector 1312, and a second optical detector 1314 are disposed in the emitter compartment 1302. A third optical detector 1316 is disposed in the detector compartment 1306. Each of the first and second optical detectors 1312, 1314 may be implemented as an intensity based detector (e.g., one or a few photodiodes) or a ToF sensor (e.g., one or a few SPADs). The third optical detector 1316 may be implemented as an image sensor or an array of ToF sensors (e.g., an array of SPADs).

A first set of one or more optical elements 1318 may be disposed in the emitter compartment 1302 and direct light out of and into the emitter compartment 1302, through the first aperture 1304. A second set of one or more optical elements 1320 may be disposed in the detector compartment 1306 and direct light into the detector compartment 1306, through the second aperture 1308.

The optical element(s) 1318 may include a first light pipe 1322, or other optical elements, that receive light emitted by the optical emitter 1310 at a first surface 1324 (e.g., a first surface 1324 of the light pipe 1322). In some embodiments, the first surface 1324 may receive light emitted by the optical emitter 1310 within a range of incident angles. In some embodiments, the first surface 1324 may have a non-perpendicular orientation with respect to an axis of the light emitted by the optical emitter 1310. In some embodiments, the light pipe 1322 may be cylindrical, with the first surface 1324 being formed by a first chamfer at a first end of the light pipe 1322 and a second surface 1326 being formed by a second chamfer at a second end of the light pipe 1322. The first and second chamfers may have different orientations, such that the first and second surfaces 1324, 1326 are non-parallel. Light entering the first surface 1324 of the light pipe 1322 may reflect along the sidewall of the light pipe 1322 and be redirected as it exits the second surface 1326 of the light pipe 1322 and travels through the first aperture 1304. Similarly, light returned from a target and entering the second surface 1326 of the light pipe 1322, via the first aperture 1304, may reflect along the sidewall of the light pipe 1322 and be redirected as it exits the first surface 1324 of the light pipe 1322.

The optical element(s) 1320 may include a second light pipe 1328, or other optical elements, that receive, through the second aperture 1308, light returned from a target.

Returned light may be received at a first surface 1330 of the light pipe 1328 and emitted from a second surface 1332 of the light pipe 1328. In some embodiments, the light pipe 1328 may be cylindrical, and the first and second surfaces 1330, 1332 may each be oriented perpendicular to a sidewall of the light pipe 1328.

In operation, a processor may cause the optical emitter 1310 to emit light into the light pipe 1322. In the absence of a target in the near, mid, or far field of the module 1300, and as shown in FIG. 13, the first optical detector 1312 may receive more returned light than the second or third optical detectors 1314, 1316. The returned light may be light returned from a cover 1334 through which the module 1300 emits and receives light. The output of the first optical detector 1312, or the outputs of all of the optical detectors 1312, 1314, 1316, in the absence of a target, may be used by the processor to establish a baseline for the module 1300.

When a target 1400, and particularly a target having a diffusive surface or volume, such as a finger or other body part, touches the cover 1334 (see FIG. 14), the second optical detector 1314 may receive more returned light than the first or third optical detectors 1312, 1316. The output of the second optical detector 1314, or the outputs of all of the optical detectors 1312, 1314, 1316, when a user is touching the cover 1334, may be used by the processor to identify the presence of, or a distance to, the touch. When the target 1400 is moved to different locations within a near or mid field of the module 1300, the first and/or second optical detector 1312, 1314 may receive returned light. The output of the first and second optical detectors 1312, 1314 may be used by the processor to identify a presence of, a distance to, or a location of the target 1400.

When a target 1500 is present within a mid or far field of the module 1300 (see FIG. 15), the third optical detector 1316 may receive returned light than the first or second optical detectors 1312, 1314. The output of the third optical detector 1316, or the outputs of all of the optical detectors 1312, 1314, 1316, when a target 1500 is present within the mid or far field of the module 1300, may be used by the processor to identify a presence of, a distance to, or a location of the target 1500. The distance to the target 1500 may in some cases be determined based on an intensity of light received by a photodiode, or based on a ToF of an emitted pulse returned to a SPAD. However, when the third optical detector 1316 includes an array of intensity-based detection elements (e.g., photodiodes) or ToF detection elements (e.g., SPADs), the positions of a subset of detection elements that receive the returned light can also be used to determine the distance to, or location of, the target 1500.

In some embodiments, the optical element(s) 1320 may be shaped, oriented, or positioned to prevent light returned from a near field target from reaching the third optical detector 1316, or mitigate the chance of light returned from a near field target reaching the third optical detector 1316.

Figure 16:
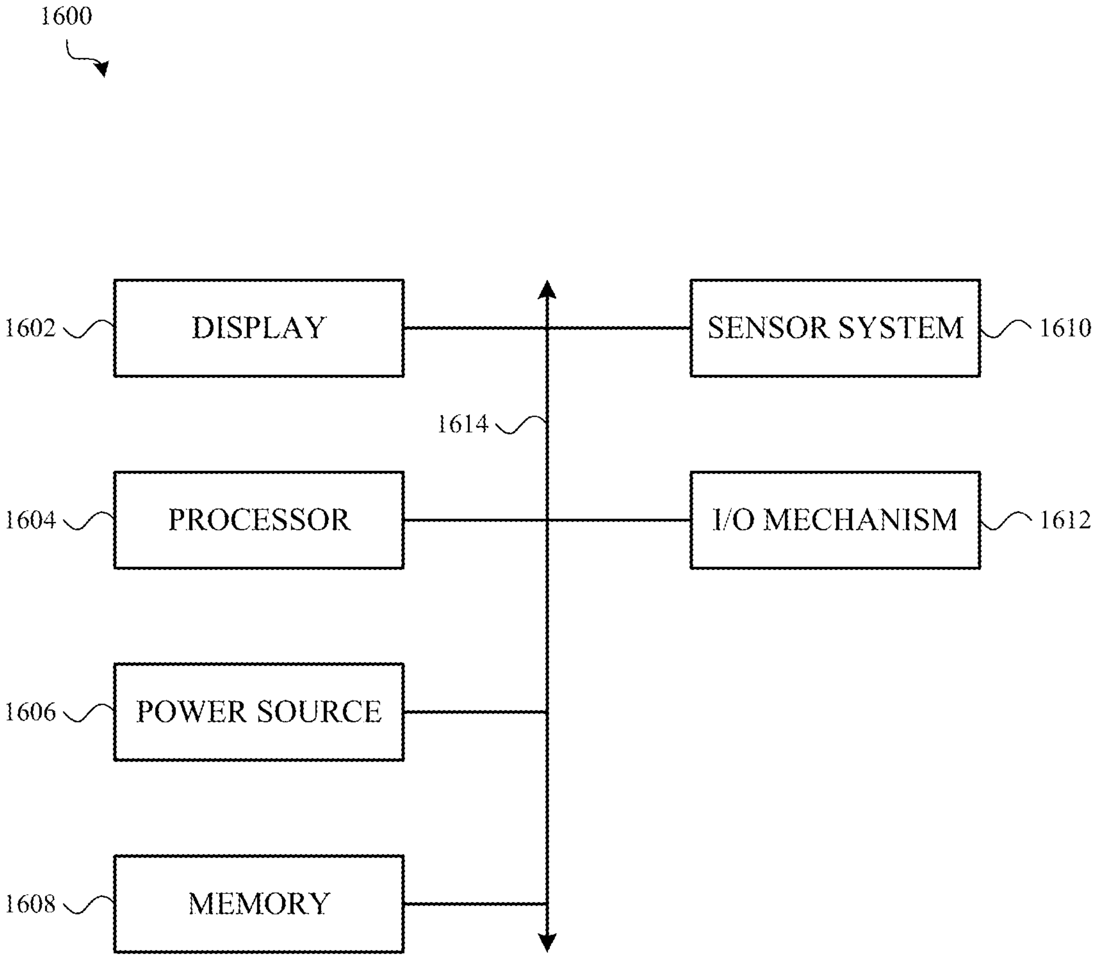
FIG. 16 shows an example electrical block diagram of an electronic device.

FIG. 16 shows a sample electrical block diagram of an electronic device 1600, which electronic device may in some embodiments include one or more of the optical sensor modules described with reference to any of FIGS. 1-15. The electronic device 1600 may include an electronic display 1602 (e.g., a light-emitting display), a processor 1604, a power source 1606, a memory 1608 or storage device, a sensor system 1610, or an input/output (I/O) mechanism 1612 (e.g., an input/output device, input/output port, or haptic input/output interface). The processor 1604 may control some or all of the operations of the electronic device 1600. The processor 1604 may communicate, either directly or indirectly, with some or all of the other components of the electronic device 1600. For example, a system bus or other communication mechanism 1614 can provide communication between the electronic display 1602, the processor 1604, the power source 1606, the memory 1608, the sensor system 1610, and the I/O mechanism 1612.

The processor 1604 may be implemented as any electronic device capable of processing, receiving, or transmitting data or instructions, whether such data or instructions is in the form of software or firmware or otherwise encoded. For example, the processor 1604 may include a microprocessor, a central processing unit (CPU), an application-specific integrated circuit (ASIC), a digital signal processor (DSP), a controller, or a combination of such devices. As described herein, the term "processor" is meant to encompass a single processor or processing unit, multiple processors, multiple processing units, or other suitably configured computing element or elements. In some embodiments, the processor 1604 may provide part or all of the processing systems or processors described with reference to FIGS. 1-15.

It should be noted that the components of the electronic device 1600 can be controlled by multiple processors. For example, select components of the electronic device 1600 (e.g., the sensor system 1610) may be controlled by a first processor and other components of the electronic device 1600 (e.g., the electronic display 1602) may be controlled by a second processor, where the first and second processors may or may not be in communication with each other.

The power source 1606 can be implemented with any device capable of providing energy to the electronic device 1600. For example, the power source 1606 may include one or more batteries or rechargeable batteries. Additionally or alternatively, the power source 1606 may include a power connector or power cord that connects the electronic device 1600 to another power source, such as a wall outlet.

The memory 1608 may store electronic data that can be used by the electronic device 1600. For example, the memory 1608 may store electrical data or content such as, for example, audio and video files, documents and applications, device settings and user preferences, timing signals, control signals, and data structures or databases. The memory 1608 may include any type of memory. By way of example only, the memory 1608 may include random access memory, read-only memory, Flash memory, removable memory, other types of storage elements, or combinations of such memory types.

The electronic device 1600 may also include one or more sensor systems 1610 positioned almost anywhere on the electronic device 1600. In some embodiments, the sensor systems 1610 may include one or more optical sensors, configured as described with reference to any of FIGS. 1-15. The sensor system(s) 1610 may be configured to sense one or more types of parameters, such as but not limited to, vibration; light; touch; force; heat; movement; relative motion; biometric data (e.g., biological parameters) of a user; air quality; proximity; position; or connectedness. By way of example, the sensor system(s) 1610 may include an SMI sensor, a Mach-Zender interferometer, a heat sensor, a position sensor, a light or optical sensor, an accelerometer, a pressure transducer, a gyroscope, a magnetometer, a health monitoring sensor, and/or an air quality sensor. Additionally, the one or more sensor systems 1610 may utilize any suitable sensing technology, including, but not limited to, interferometric, magnetic, capacitive, ultrasonic, resistive, optical, acoustic, piezoelectric, or thermal technologies.

The I/O mechanism 1612 may transmit or receive data from a user or another electronic device. The I/O mechanism 1612 may include the electronic display 1602, a touch sensing input surface, a crown, one or more buttons (e.g., a mechanical button or a graphical user interface button), one or more cameras (including an under-display camera), one or more microphones or speakers, one or more ports such as a microphone port, and/or a keyboard. Additionally or alternatively, the I/O mechanism 1612 may transmit electronic signals via a communications interface, such as a wireless, wired, and/or optical communications interface. Examples of wireless and wired communications interfaces include, but are not limited to, cellular and Wi-Fi communications interfaces.

The foregoing description, for purposes of explanation, uses specific nomenclature to provide a thorough understanding of the described embodiments. However, it will be apparent to one skilled in the art, after reading this description, that the specific details are not required in order to practice the described embodiments. Thus, the foregoing descriptions of the specific embodiments described herein are presented for purposes of illustration and description. They are not targeted to be exhaustive or to limit the embodiments to the precise forms disclosed. It will be apparent to one of ordinary skill in the art, after reading this description, that many modifications and variations are possible in view of the above teachings.

As described above, one aspect of the present technology may be the gathering and use of data available from various sources, including biometric data (e.g., fingerprint information, facial information, user presence, and so on). The present disclosure contemplates that, in some instances, this gathered data may include personal information data that uniquely identifies or can be used to identify, locate, or contact a specific person. Such personal information data can include, for example, biometric data and data linked thereto (e.g., demographic data, location-based data, telephone numbers, email addresses, home addresses, data or records relating to a user's health or level of fitness (e.g., vital signs measurements, medication information, exercise information), date of birth, or any other identifying or personal information).

The present disclosure recognizes that the use of such personal information data, in the present technology, can be used to the benefit of users. For example, the personal information data can be used to authenticate a user to access their device, or gather performance metrics for the user's interaction with an augmented or virtual world. Further, other uses for personal information data that benefit the user are also contemplated by the present disclosure. For instance, health and fitness data may be used to provide insights into a user's general wellness, or may be used as positive feedback to individuals using technology to pursue wellness goals.

The present disclosure contemplates that the entities responsible for the collection, analysis, disclosure, transfer, storage, or other use of such personal information data will comply with well-established privacy policies and/or privacy practices. In particular, such entities should implement and consistently use privacy policies and practices that are generally recognized as meeting or exceeding industry or governmental requirements for maintaining personal information data private and secure. Such policies should be easily accessible by users, and should be updated as the collection and/or use of data changes. Personal information from users should be collected for legitimate and reasonable uses of the entity and not shared or sold outside of those legitimate uses. Further, such collection/sharing should occur after receiving the informed consent of the users. Additionally, such entities should consider taking any needed steps for safeguarding and securing access to such personal information data and ensuring that others with access to the personal information data adhere to their privacy policies and procedures. Further, such entities can subject themselves to evaluation by third parties to certify their adherence to widely accepted privacy policies and practices. In addition, policies and practices should be adapted for the particular types of personal information data being collected and/or accessed and adapted to applicable laws and standards, including jurisdiction-specific considerations. For instance, in the US, collection of or access to certain health data may be governed by federal and/or state laws, such as the Health Insurance Portability and Accountability Act (HIPAA); whereas health data in other countries may be subject to other regulations and policies and should be handled accordingly. Hence different privacy practices should be maintained for different personal data types in each country.

Despite the foregoing, the present disclosure also contemplates embodiments in which users selectively block the use of, or access to, personal information data. That is, the present disclosure contemplates that hardware and/or software elements can be provided to prevent or block access to such personal information data. For example, in the case of advertisement delivery services, the present technology can be configured to allow users to select to "opt in" or "opt out" of participation in the collection of personal information data during registration for services or anytime thereafter. In another example, users can select not to provide data to targeted content delivery services. In yet another example, users can select to limit the length of time data is maintained or entirely prohibit the development of a baseline profile for the user. In addition to providing "opt in" and "opt out" options, the present disclosure contemplates providing notifications relating to the access or use of personal information. For instance, a user may be notified upon downloading an app that their personal information data will be accessed and then reminded again just before personal information data is accessed by the app.

Moreover, it is the intent of the present disclosure that personal information data should be managed and handled in a way to minimize risks of unintentional or unauthorized access or use. Risk can be minimized by limiting the collection of data and deleting data once it is no longer needed. In addition, and when applicable, including in certain health related applications, data de-identification can be used to protect a user's privacy. De-identification may be facilitated, when appropriate, by removing specific identifiers (e.g., date of birth), controlling the amount or specificity of data stored (e.g., collecting location data at a city level rather than at an address level), controlling how data is stored (e.g., aggregating data across users), and/or other methods.

Therefore, although the present disclosure broadly covers use of personal information data to implement one or more various disclosed embodiments, the present disclosure also contemplates that the various embodiments can also be implemented without the need for accessing such personal information data. That is, the various embodiments of the present technology are not rendered inoperable due to the lack of all or a portion of such personal information data. For example, content can be selected and delivered to users by inferring preferences based on non-personal information data or a bare minimum amount of personal information, such as the content being requested by the device associated with a user, other non-personal information available to the content delivery services, or publicly available information.

What is claimed is:

1. An optical sensor module, comprising:
a module housing defining,
a first compartment having a first aperture; and
a second compartment having a second aperture, the second aperture spaced apart from the first aperture;
a set of one or more optical emitters disposed in the first compartment and configured to emit light through the first aperture, the set of one or more optical emitters including:
a first optical emitter configured to emit a first light; and
a second optical emitter configured to emit a second light;
a first set of one or more optical detectors disposed in the first compartment and configured to receive a first redirected portion of the emitted light through the first aperture;
a set of one or more optical elements disposed in the first compartment and configured to direct at least a portion of the emitted light or the first redirected portion of the emitted light; and
a second set of one or more optical detectors disposed in the second compartment and configured to receive a second redirected portion of the emitted light through the second aperture, wherein:
a first axis of the emitted light impinges on the set of one or more optical elements at a first range of incident angles; and
a second axis of the emitted light impinges on the set of one or more optical elements at a second range of incident angles different from the first range of incident angles.

2. The optical sensor module of claim 1, wherein:
the first set of one or more optical detectors includes a first optical detector; and
the set of one or more optical elements,
receives a first light emitted by the first optical emitter;
directs the first light through the first aperture;
directs a Lambertian-reflected first portion of the first light toward the first optical detector; and
mitigates impingement of a specular-reflected second portion of the first light on the first optical detector.

3. The optical sensor module of claim 2, wherein:
the set of one or more optical elements,
receives a second light emitted by the second optical emitter; and
directs the second light through the first aperture, into an emission field different from an emission field of the first light.

4. The optical sensor module of claim 3, wherein:
the first set of one or more optical detectors includes a second optical detector; and
the set of one or more optical elements directs a specular-reflected portion of the second light toward the second optical detector.

5. The optical sensor module of claim 1, wherein:
the set of one or more optical elements receives and directs light emitted by the first optical emitter through a surface of an optical element in the set of one or more optical elements; and
the surface has an anti-reflective coating or surface treatment.

6. The optical sensor module of claim 1, wherein:
a first optical detector in the first set of one or more optical detectors is configured to receive a redirected portion of the first light when a diffuse or volume scattering object is within a near field of the optical sensor module; and
a second optical detector in the second set of one or more optical detectors is configured to receive a redirected portion of the second light when a diffuse or volume scattering object is within a far field of the optical sensor module.

7. The optical sensor module of claim 1, wherein:
the set of one or more optical elements comprises an optical element having a light-receiving surface that is tilted at a non-right angle with respect to an axis of a first light emitted by the first optical emitter.

8. The optical sensor module of claim 1, wherein:
the first set of one or more optical detectors includes a first optical detector and a second optical detector; and
the set of one or more optical elements,
receives a first light emitted by the first optical emitter;
directs the first light through the first aperture; and
directs a return of the first light through the first aperture to one or both of the first optical detector or the second optical detector.

9. The optical sensor module of claim 1, wherein:
the second set of one or more optical detectors comprises an array of optical detectors;
the light received through the second aperture is received by one or more optical detectors in the array of optical detectors; and
positions of the one or more optical detectors that receive the light through the second aperture indicate a distance of an object from which the light is returned.

10. The optical sensor module of claim 1, wherein:
the first set of one or more optical detectors includes an optical detector; and
the first optical emitter and the optical detector form parts of a self-mixing interferometry (SMI) sensor.

11. A bistatic optical sensor module, comprising:
an emitter compartment having a first aperture;
a detector compartment having a second aperture;
an optical emitter disposed in the emitter compartment;
an optical detector disposed in the emitter compartment; and
a set of one or more polarization-dependent optical elements in the emitter compartment, the set of one or more polarization-dependent optical elements receiving light emitted by the optical emitter, emitting light having a first polarization through the first aperture, and passing light received through the first aperture and having a second polarization to the optical detector.

12. The bistatic optical sensor module of claim 11, wherein the light emitted by the optical emitter has the first polarization.

13. The bistatic optical sensor module of claim 11, wherein:
the optical detector is a first optical detector;
the bistatic optical sensor module comprises a second optical detector in the emitter compartment; and
the set of one or more polarization-dependent optical elements comprises an optical beam splitter, the optical beam splitter directing the light received through the first aperture and having the second polarization toward the first optical detector, and the optical beam splitter directing light received through the first aperture and having the first polarization toward the second optical detector.

14. The bistatic optical sensor module of claim 13, further comprising:
a processor configured to, determine a first amount of light received by the first optical detector;

determine a second amount of light received by the second optical detector;

compare the first amount of light to the second amount of light; and determine, from the comparison, a presence of an object.

15. A bistatic optical sensor module, comprising:

an emitter compartment;

a far field optical emitter disposed in the emitter compartment;

a detector compartment;

a first single-photon avalanche detector (SPAD) disposed in the emitter compartment;

a second SPAD disposed in the detector compartment and configured to receive a returned portion of a first light emitted by the far field optical emitter; and a near field optical emitter disposed in the emitter compartment, wherein:

the first SPAD is configured to receive a returned portion of a second light emitted by the near field optical emitter.

16. The bistatic optical sensor module of claim 15, further comprising:

a third SPAD disposed in the detector compartment;

a set of one or more optical elements disposed in the detector compartment, the set of one or more optical elements configured to, receive a returned portion of light emitted by the far field optical emitter or the near field optical emitter; and direct the returned portion of the light to one or both of the second SPAD or the third SPAD.

17. The bistatic optical sensor module of claim 15, further comprising:

an array of SPADs in the detector compartment; wherein, light emitted by the optical emitter and returned to the array of SPADs is received by a subset of one or more SPADs in the array of SPADs; and positions of the SPADs in the subset of one or more SPADs indicate at least one of a distance to, or location of, an object from which the light is returned.

* * * * *